United States Patent
Okamoto

(10) Patent No.: US 10,920,073 B2
(45) Date of Patent: *Feb. 16, 2021

(54) POLYURETHANE CURABLE COMPOSITION CONTAINING POLYMER FINE PARTICLES EXCELLENT IN MECHANICAL STRENGTH

(71) Applicant: Kaneka Corporation, Osaka (JP)

(72) Inventor: Toshihiko Okamoto, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 127 days.

This patent is subject to a terminal disclaimer.

(21) Appl. No.: 16/061,193

(22) PCT Filed: Dec. 8, 2016

(86) PCT No.: PCT/JP2016/086631
§ 371 (c)(1),
(2) Date: Jun. 11, 2018

(87) PCT Pub. No.: WO2017/099196
PCT Pub. Date: Jun. 15, 2017

(65) Prior Publication Data
US 2018/0371238 A1 Dec. 27, 2018

(30) Foreign Application Priority Data
Dec. 11, 2015 (JP) .................. 2015-242463

(51) Int. Cl.
| | |
|---|---|
| C08L 75/08 | (2006.01) |
| C08G 18/06 | (2006.01) |
| C08L 75/04 | (2006.01) |
| C08G 18/48 | (2006.01) |
| C08G 18/32 | (2006.01) |
| C08G 18/66 | (2006.01) |
| C09J 175/08 | (2006.01) |
| C08G 18/76 | (2006.01) |
| C08G 18/63 | (2006.01) |
| C08G 18/08 | (2006.01) |
| C08G 18/42 | (2006.01) |
| C08L 33/08 | (2006.01) |
| C08L 33/10 | (2006.01) |
| C09J 11/08 | (2006.01) |

(52) U.S. Cl.
CPC .............. *C08L 75/04* (2013.01); *C08G 18/08* (2013.01); *C08G 18/3206* (2013.01); *C08G 18/4247* (2013.01); *C08G 18/4812* (2013.01); *C08G 18/4825* (2013.01); *C08G 18/4829* (2013.01); *C08G 18/632* (2013.01); *C08G 18/664* (2013.01); *C08G 18/7664* (2013.01); *C08L 33/08* (2013.01); *C08L 33/10* (2013.01); *C09J 175/08* (2013.01); *C08G 18/0838* (2013.01); *C08L 2207/53* (2013.01); *C09J 11/08* (2013.01)

(58) Field of Classification Search
None
See application file for complete search history.

(56) References Cited

U.S. PATENT DOCUMENTS

| | | | |
|---|---|---|---|
| 4,251,428 | A | 2/1981 | Recker et al. |
| 5,401,785 | A | 3/1995 | Kumagai et al. |
| 6,159,405 | A | 12/2000 | Taylor |
| 2002/0045690 | A1 | 4/2002 | Cheolas et al. |
| 2003/0134085 | A1 | 7/2003 | Haas et al. |

(Continued)

FOREIGN PATENT DOCUMENTS

| | | |
|---|---|---|
| JP | S55157620 A | 12/1980 |
| JP | H11349916 A | 12/1999 |

(Continued)

OTHER PUBLICATIONS

"fine, adj., adv., and n.2". OED Online. Dec. 2019. Oxford University Press. Retrieved from oed.com on Jan. 8, 2020. (Year: 2020).*

(Continued)

*Primary Examiner* — Richard A Huhn
(74) *Attorney, Agent, or Firm* — Osha Bergman Watanabe & Burton LLP

(57) ABSTRACT

The object of the present invention is to provide a curable composition for forming a cured product having high tensile strength and high elongation. A polyurethane curable composition of the present invention contains a polyol (A) and a polyisocyanate (B) as an essential component, wherein the composition contains polymer fine particles (C) having a core-shell structure including at least two layers of a core layer and a shell layer, the polymer fine particles (C) are contained in an amount of 1 to 150 parts by mass per 100 parts by mass of a total amount of the polyol (A) and the polyisocyanate (B), the core layer has a glass transition temperature (Tg) of more than 0° C. as calculated by the following numerical formula (1), a cured product formed by the curable composition has an elongation of more than 47% at a maximum tensile stress, $$1/Tg = \Sigma(M_i/Tg_i) \qquad (1)$$

wherein $M_i$ represents a weight fraction of a non-crosslinking monomer i constituting the core layer of the polymer fine particles (C), $Tg_i$ represents a glass transition temperature (K) of a homopolymer polymerized with the non-crosslinking monomer i, and i represents an integer of 1 or more.

22 Claims, No Drawings

(56) References Cited

U.S. PATENT DOCUMENTS

| | | |
|---|---|---|
| 2003/0212192 A1 | 11/2003 | Yuan et al. |
| 2004/0094859 A1 | 5/2004 | Cheolas et al. |
| 2006/0173128 A1 | 8/2006 | Connolly |
| 2007/0027263 A1 | 2/2007 | Furukawa et al. |
| 2007/0098997 A1 | 5/2007 | Younes et al. |
| 2007/0210476 A1 | 9/2007 | Sasatani et al. |
| 2008/0020194 A1 | 1/2008 | Younes et al. |
| 2008/0085975 A1 | 4/2008 | Saegusa et al. |
| 2009/0209671 A1 | 8/2009 | Emge et al. |
| 2009/0214873 A1 | 8/2009 | Demmig |
| 2009/0234038 A1 | 9/2009 | Wada et al. |
| 2009/0264558 A1 | 10/2009 | Kramer et al. |
| 2010/0222507 A1 | 9/2010 | Nakada et al. |
| 2011/0046251 A1 | 2/2011 | Wada et al. |
| 2012/0159785 A1 | 6/2012 | Pyles et al. |
| 2012/0245286 A1 | 9/2012 | Younes |
| 2013/0274358 A1 | 10/2013 | Yabuno et al. |
| 2014/0113983 A1 | 4/2014 | Czaplicki et al. |
| 2014/0203024 A1 | 7/2014 | Demmig |
| 2016/0122539 A1* | 5/2016 | Okamoto .................. C08J 5/04 428/319.7 |

FOREIGN PATENT DOCUMENTS

| | | | |
|---|---|---|---|
| JP | 2002530445 A | 9/2002 | |
| JP | 2003155389 A | 5/2003 | |
| JP | 2003220661 A | 8/2003 | |
| JP | 2005-272647 A | 10/2005 | |
| JP | 2006143759 A | 6/2006 | |
| JP | 2007125889 A | 5/2007 | |
| JP | 2008530294 A | 8/2008 | |
| JP | 2009-108278 A | 5/2009 | |
| JP | 2010116429 A | 5/2010 | |
| JP | 2010270198 A | 12/2010 | |
| JP | 2011190286 A | 9/2011 | |
| JP | 2012-251053 A | 12/2012 | |
| JP | 2013504007 A | 2/2013 | |
| JP | 2013064150 A | 4/2013 | |
| JP | 2014-083904 A | 5/2014 | |
| WO | 2005028546 A1 | 3/2005 | |
| WO | 2006070664 A1 | 7/2006 | |
| WO | 2009014037 A1 | 1/2009 | |
| WO | 2012077688 A1 | 6/2012 | |
| WO | 2014/196607 A1 | 12/2014 | |
| WO | WO-2014196607 A1 * | 12/2014 | ............. C08G 18/42 |

OTHER PUBLICATIONS

Extended European Search Report issued in European Application No. 16873089.3, dated Aug. 2, 2019 (7 pages).

International Search Report issued in PCT/JP2016/086631 dated Feb. 21, 2017 (2 pages).

Written Opinion of the International Searching Authority issued in PCT/JP2016/086631 dated Feb. 21, 2017 (3 pages).

T. Okazaki et al., "Effects of Blend Ratio of Chain Extender on Friction and Abrasion Characteristics of Polyurethanes", Journal of the Society of Rubber Industry, 1995, vol. 68, pp. 417-426, with its partial English translation (13 pages).

Extended European Search Report issued in European Application No. 14806856.2, dated Feb. 1, 2017 (6 pages).

* cited by examiner

POLYURETHANE CURABLE COMPOSITION CONTAINING POLYMER FINE PARTICLES EXCELLENT IN MECHANICAL STRENGTH

TECHNICAL FIELD

The present invention relates to a curable composition containing as a main component a urethane, which has a lower viscosity before curing and is cured to form a rubber cured product having excellent mechanical strength. Especially, the present invention relates to an adhesive containing the curable composition.

BACKGROUND ART

The adhesive containing a polyurethane as a main component indicates good adhesive property to various adherends such as plastic, wood, and metal, and a wide range of mechanical properties from soft to hard by combining various isocyanate group-containing compounds and various active hydrogen group-containing compounds as raw materials, so that the adhesive containing the polyurethane has been used in many applications.

In general, a steel plate has been used as a structural member of a vehicle. In recent years, an aluminum plate, an FRP plate and the like have been applied to the structural member according to the needs of reduction in weight of vehicles. Therefore, there is a case where a plurality of members having different linear expansion coefficients each other are bonded together with an adhesive agent for structures. However, as described in Patent Documents 1 to 3, when a combination of different types of members is used as a vehicle exterior panel, the panels have large areas and lower stiffness, and therefore the following problems often arise: when the panels are bonded together with an adhesive agent having high stiffness and a low elongation, an internal stress is generated due to the difference in linear expansion coefficient between the different substrates according to the change in temperature, resulting in the generation of strain in the vehicle exterior panel, the detachment of bonding surfaces and the like. Furthermore, in Patent Documents 1 to 3, there is no teaching about polymer fine particles each having a core-shell structure, and any requirement needed for the combination of polymer fine particles and a polyurethane.

In addition, patent Document 4 discloses a technique that toughness is improved by adding organic fine particles having a core-shell structure to a hard polyurethane using a polyol having a high hydroxyl value.

PRIOR ART DOCUMENTS

Patent Document

Patent Document 1: Japanese unexamined patent application publication No. 2005-272647
Patent Document 2: Japanese unexamined patent application publication No. 2009-108278
Patent Document 3: Japanese unexamined patent application publication No. 2014-83904
Patent Document 4: WO2014/196607

SUMMARY OF THE INVENTION

Problems to be Solved by the Invention

However, in the technique of Patent Document 4, the cured product obtained is a hard polyurethane expressing no rubber elasticity at room temperature, the rubber graft copolymer cannot sufficiently exhibit an original characteristic, and high elongation property is not exhibited in some cases, so that it is desired that a curable composition can exhibit high strength and high elongation.

Therefore, the object of the present invention is to provide a urethane curable composition for forming a cured product having rubber elasticity and excellent mechanical property. That is, the object of the present invention is to provide a curable composition for forming a cured product having high tensile strength and high elongation.

Further, in the preferred embodiment, the object of the present invention is to provide a curable composition for forming a cured product having moderate hardness in durometer A hardness.

Solutions to the Problems

The inventors have found that the problem is solved by the polyurethane curable composition containing as essential components a polyol (A) and a polyisocyanate (B), and further containing polymer fine particles (C) having a core-shell structure and a core layer of s glass transition temperature of more than 0° C. in a given amount, such that the cured product exhibits an elongation of more than 47% at a maximum tensile stress, to complete the present invention.

Specifically, the gist of the present invention is as follows.
[1] A polyurethane curable composition containing a polyol (A) and a polyisocyanate (B) as an essential component, wherein the composition contains polymer fine particles (C) having a core-shell structure including at least two layers of a core layer and a shell layer,
the polymer fine particles (C) are contained in an amount of 1 to 150 parts by mass per 100 parts by mass of a total amount of the polyol (A) and the polyisocyanate (B),
the core layer has a glass transition temperature (Tg) of more than 0° C. as calculated by the following numerical formula (1), $$1/Tg = \Sigma(M_i/Tg_i) \quad (1)$$

wherein $M_i$ represents a weight fraction of a non-crosslinking monomer i constituting the core layer of the polymer fine particles (C), $Tg_i$ represents a glass transition temperature (K) of a homopolymer polymerized with the non-crosslinking monomer i, and i represents an integer of 1 or more.
[2] The curable composition according to [1], wherein a cured product famed by the curable composition has an elongation of more than 47% at a maximum tensile stress.
[3] The curable composition according to [1] or [2], wherein the cured product famed from the curable composition has durometer A hardness of 5 to 95 at 23° C. as defined by JIS K6253-3.
[4] The curable composition according to any one of [1] to [3], wherein the polyol (A) has an average hydroxyl value of 1 to 300 mgKOH/g.
[5] The curable composition according to any one of [1] to [4], wherein the polyol (A) is a polyetheipolyol and/or an acrylpolyol.
[6] The curable composition according to [5], wherein the polyetheipolyol is a polyoxypropylenepolyol.
[7] The curable composition according to any one of [1] to [6], wherein the core layer of the polymer fine particles (C) is a (meth)acrylate polymer.
[8] The curable composition according to any one of [1] to [7], wherein the core layer of the polymer fine particles (C)

contains a polymer polymerized with 80 to 99% by mass of the non-crosslinking monomer and 20 to 1% by mass of a crosslinking monomer.

[9] The curable composition according to any one of [1] to [8], wherein the shell layer of the polymer fine particles (C) is a (meth)acrylate polymer.

[10] The curable composition according to any one of [1] to [9], wherein the shell layer of the polymer fine particles (C) has a hydroxyl group.

[11] The curable composition according to any one of [1] to [10], wherein the shell layer of the polymer fine particles (C) has the hydroxyl group in an amount of 0.05 to 3.5 mmol/g.

[12] The curable composition according to any one of [1] to [11], wherein the polymer fine particles (C) have the shell layer graft-polymerized on the core layer, and the shell layer is polymerized with at least a monomer having a hydroxyl group.

[13] The curable composition according to any one of [10] to [12], wherein the polyol (A) contains a polyol (A-i) for dispersing the polymer fine particles (C) and a polyol (A-ii) for addition which is different from the polyol (A-i) for dispersing the polymer fine particles (C), the polyol (A-i) has an average hydroxyl value of 1 to 300 mgKOH/g, and the curable composition contains a dispersion including the polymer fine particles (C) having a hydroxyl group in the shell layer and the polyol (A-i) for dispersing the polymer fine particles (C), the polyol (A-ii) for addition, and the polyisocyanate (B).

[14] The curable composition according to [13], wherein the polyol (A-i) has an average hydroxyl value of 120 mgKOH/g or less.

[15] The curable composition according to any one of [1] to [14], wherein the polyol (A) contains a polyesterpolyol of 50% by mass or less per 100% by mass of the polyol (A).

[16] The curable composition according to any one of [1] to [15], wherein the polymer fine particles (C) are dispersed in the curable composition in the state of primary particle.

[17] The curable composition according to any one of [1] to [16], wherein the polyol (A) contains a multifunctional polyol having three or more functionality.

[18] The curable composition according to any one of [1] to [17], wherein the composition contains a urethane prepolymer produced from the reaction of the polyol (A) and the polyisocyanate (B).

[19] The curable composition according to [18], wherein the urethane prepolymer produced from the reaction of the polyol (A) and the polyisocyanate (B) has an isocyanate group, and an equivalent ratio (NCO/active hydrogen-containing group) of the isocyanate group (NCO) of the polyisocyanate (B) to the active hydrogen-containing group of the polyol (A) is 1.05 to 5.0.

[20] An one pack type moisture-curable composition containing the curable composition according to [19].

[21] A two pack type curable composition containing the curable composition according to any one of [1] to [19], wherein the composition is composed of a first solution containing the polyisocyanate (B) and a second solution containing the polyol (A), and the polymer fine particles (C).

[22] The curable composition according to any one of [1] to [21], wherein an amount of water is 1 part by mass or less per 100 parts by mass of a total amount of the polyol (A) and the polyisocyanate (B).

[23] The curable composition according to any one of [1] to [22], wherein a urethane bond is contained in a main backbone of a polymer in the cured product famed from the curable composition.

[24] A cured product containing the curable composition according to any one of [1] to [23].

[25] A adhesive containing the curable composition according to any one of [1] to [23].

Effects of the Invention

According to the curable composition of the present invention, the composition has a lower viscosity before curing, and the cured product has excellent mechanical strength.

That is, according to the present invention, the cured product exhibiting high tensile strength and high elongation can be obtained.

Further, according to the present invention, the cured product exhibiting moderate hardness in durometer A hardness can be obtained.

MODES FOR CARRYING OUT THE INVENTION

Hereinafter, the curable composition of the present invention is explained in more detail.

The curable composition of the present invention is a polyurethane curable composition containing as a main component a polyurethane using a polyol (A), a polyisocyanate (B) as an essential component, and further containing polymer fine particles (C). The curable composition of the present invention may further contain a filler and a dehydrating agent.

It is essential for a cured product famed from the curable composition according to the present invention to exhibit rubber elasticity at 25° C. That is, the cured product is a polymer which contains as the main component a polyurethane resin having a glass transition temperature of lower than 25° C. and which has a three-dimensional net-like structure. The cured product preferably exhibits rubber elasticity at 0° C., more preferably exhibits rubber elasticity at −20° C., and even preferably exhibits rubber elasticity at −40° C. In the case where the resultant cured product does not exhibit rubber elasticity at 25° C. and has a solid form, even if polymer fine particles (C) as mentioned below are used in combination, the effect to improve mechanical strength including maximum tensile stress cannot be achieved. It is preferred that the resultant cured product also exhibits rubber elasticity at a temperature as low as −40° C. and the like, because the change in elastic modulus due to the decrease in environmental temperature is small and properties including a low elastic modulus and a high elongation can be achieved in a wide temperature range. The glass transition temperature of the resultant cured product can be evaluated by subjecting the cured product to a DSC measurement or a dynamic viscoelasticity measurement.

The cured product formed from the curable composition of the present invention has a maximum tensile stress of, for example, 1.9 MPa or more, preferably 2.1 MPa or more, more preferably 2.7 MPa or more, and even preferably 5.5 MPa or more. The upper limit of the maximum tensile stress is not limited particularly, and, for example, 40 MPa or less, preferably 30 MPa or less, more preferably 20 MPa or less, and even preferably 11.8 MPa or less.

The cured product formed from the curable composition of the present invention has an elongation of, for example, 10% or more, preferably more than 47%, more preferably 50% or more, even preferably 61% or more, even more preferably 74% or more, and for example, 400% or less, preferably 350% or less, and more preferably 308% or less, at a maximum tensile stress.

The maximum tensile stress and the elongation at the maximum tensile stress can be measured in accordance with, for example, JIS-K-6251, JIS-C-2151 or ASTM-D-882.

Concretely, a cured product specimen is drawn at a speed of 200 mm/min with a tension tester, and a strength (a value obtained by dividing a tensile load value by the sectional area of the specimen) and an elongation at which the cured product specimen is torn (broken) are determined. The tensile elongation can be calculated in accordance with the following formula:

$$\text{tensile elongation (\%)}=100\times(L-Lo)/Lo$$

(Lo: the length of the specimen before test; and L: the length of the specimen at breaking).

The cured product formed from the curable composition has durometer A hardness at 23° C. as defined in JIS K6253-3 of preferably 5 to 95, more preferably 20 to 90, even preferably 30 to 87, and particularly preferably 40 to 85. If the cured product has the durometer A hardness of less than 5, the tensile strength of the cured product may be insufficient. If the cured product has the durometer A hardness of more than 95, the rubber elasticity may be insufficient, resulting in the deterioration in elongation properties.

It is essential for a cured product formed from the curable composition according to the present invention to exhibit rubber elasticity at 25° C. The cured product may be a thermosetting elastomer or a thermoplastic elastomer, and is preferably a thermosetting elastomer from the viewpoint of heat resistance.

<Polyol (A)>

A polyol (A) is used in the curable composition of the present invention. The polyol (A) may be used individually or in two or more polyols. In the polyurethane curable composition of the present invention, the total polyol (A) has an average hydroxyl value of preferably 1 to 300 mg KOH/g, more preferably 5 to 250 mg KOH/g, even preferably 10 to 200 mg KOH/g, especially preferably 30 to 150 mg KOH/g, and most preferably 60 to 120 mg KOH/g. In the case of the average hydroxyl value of less than 1 mg KOH/g, a curing rate of the curable composition becomes slow in some cases, and strength of the cured product is decreased in some cases. In the case of the average hydroxyl value of more than 300 mg KOH/g, elongation and strength of the cured product obtained are decreased in some cases.

The polyol (A) is a compound having two or more active hydrogens at terminal, and a polyol having two or more functional groups and molecular weight of 50 to 20000. The polyol (A) can include an aliphatic alcohol, an aromatic alcohol, a polyether polyol, a polyester polyol, a polyolefin polyol, an acrylate polyol and the like.

The aliphatic alcohol may be any of dihydric alcohol and a polyhydric alcohol having a hydricity of three or higher (trihydric alcohol, tetrahydric alcohol and the like). The dihydric alcohol includes alkylene glycol (alkylene glycol having about 1 to 6 of carbon atoms) such as ethylene glycol, propylene glycol, 1,3-propanediol, 1,3-butanediol, 1,4-butanediol, 1,5-pentanediol, 1,6-hexanediol, 3-methyl-1,5-pentanediol, neopentylglycol, and dehydrative condensate (diethyleneglycol, dipropyleneglycol, tripropyleneglycol and the like) from two or more molecules of the alkyleneglycol (for example, 2 to 6 molecules and the like). The trihydric alcohol includes glycerol, trimethylolpropane, trimethylolethane, 1,2,6-hexanetriol (especially trihydric alcohol having about 3 to 10 of carbon atoms). The tetrahydric alcohol includes pentaerythritol, diglycerol and the like. In addition, the aliphatic alcohol includes sugars such as monosaccharide, oligosaccharide, and polysaccharide.

The aromatic alcohol includes bisphenols such as bisphenol and bisphenol F; biphenyls such as dihydroxybiphenyl; polyhydric phenol such as hydroquinone, phenol formaldehyde condensate; naphthalenediol and the like.

The polyether polyol includes a random or block copolymer and the like obtained by ring-opening polymerizing ethylene oxide, propylene oxide, butylene oxide, styrene oxide and the like under the presence of one or two or more active hydrogen-containing initiator (s), and a mixture thereof. The active hydrogen-containing initiator includes diols such as ethylene glycol, diethylene glycol, propylene glycol, dipropylene glycol, 1,3-butane diol, 1,4-butane diol, 1,6-hexane diol, neopentyl glycol, bisphenol triols such as trimethylol ethane, trimethylol propane, glycerin; sugars such as monosaccharide, oligosaccharide, polysaccharide; sorbitol; amines such as ammonia, ethylenediamine, urea, monomethyldiethanol amine, monoethyldiethanol amine.

The polyester polyol includes a polymer obtained by condensating diprotic acids and anhydrides thereof such as maleic acid, fumaric acid, adipic acid, sebacic acid, phthalic acid, dodecanedioic acid, isophthalic acid, azelaic acid, with polyhydric alcohols such as ethylene glycol, propylene glycol, 1,4-butandiol, 1,6-hexandiol, diethylene glycol, dipropylene glycol, neopentyl glycol, 3-methyl-1,5-pentanedial under the presence of the esterification catalyst in the range of the temperature of 150 to 270° C. Further, the polyester polyol includes a ring-open polymer such as ε-caprolactone and valerolactone, and an active hydrogen compound having two or more active hydrogens such as polycarbonate diol and castor oil.

The polyolefin polyol includes polybutadiene polyol, polyisoprene polyol and hydrogenated products thereof.

The acrylate polyol includes a copolymer of a monomer having a hydroxyl group such as hydroxyl ethyl (meth) acrylate, hydroxyl butyl (meth) acrylate, and vinyl phenol with a generic monomer such as n-butyl (meth)acrylate, 2-ethylhexyl (meth)acrylate, as well as a mixture thereof.

In the present invention, (meth)acrylate contains acrylate and methacrylate.

Among these compounds, the polyol (A) is preferably a polyether polyol and/or an acrylate polyol, and more preferably a polyether polyol. The polyether polyol is preferred because the curable composition can have a low viscosity and therefore can have excellent workability, and the cured product can have excellent mechanical strength. The polyether polyol is preferably a polyoxypropylene polyol in which the main-chain structure is polyoxypropylene, because the composition can have a low viscosity and the cured product can have excellent mechanical strength. A polyether polyol of which the main-chain structure is a polyoxypropylene-polyoxyethylene copolymer is more preferred, because, when combined with polymer fine particles (C) as mentioned below, the composition can have a low viscosity and excellent workability. An EO-modified polyoxypropylene polyol in which the main component for the main-chain structure is polyoxypropylene and only the terminal thereof is modified with ethylene oxide is particularly preferred, because a hydroxyl group in the polyol can be converted to a primary hydroxyl group and therefore the resultant curable composition can have a rapid curing speed. From the viewpoint of adhesiveness, the polyester polyol is preferred.

Among these polyols, a multifunctional polyol of three or more functional groups having three or more hydroxyl groups per one molecule is preferable in the view of high reactivity on the cure and high hard cured products. That is, the polyol (A) may contain the multifunctional polyol having three or more functional groups.

The amount of the multifunctional polyol having three or more functional groups is preferably not less than 1% by mass, more preferably not less than 3% by mass, even preferably not less than 5% by mass, and especially preferably not less than 10% by mass of the total amount (100 parts by mass) of the polyol (A). The amount of the multifunctional polyol having three or more functional groups is, for example, not more than 80% by mass of the total amount (100 parts by mass) of the polyol (A). In the case where the amount of the multifunctional polyol having three or more functional groups is less than 1% by mass, strength of the cured product is decreased in some cases and a curing rate of the curable composition is slow in some cases. In the case where the amount of the multifunctional polyol having three or more functional groups is large, the cured product becomes rigid and the elongation property is not expressed in some cases.

The polyol (A) may also contain a polyester polyol in addition to a polyether polyol, from the viewpoint of imparting adhesiveness.

The polyol (A) contains a polyester polyol in an amount of preferably 50% by mass or less, more preferably 30% by mass or less, even preferably 20% by mass or less, even more preferably 10% by mass or less, and particularly preferably 0% by mass, per 100% by mass of the polyol (A). If the amount of a polyester polyol is too much, the viscosity of the composition may increase and the cured product may not exhibit rubber elasticity due to the crystallinity of the polyester polyol.

The number average molecular weight of the polyol (A) of the present invention is preferably 50 to 20000, more preferably 100 to 10000, even preferably 300 to 5000, and especially preferably 500 to 3000 based on polystyrene by GPC. In the case where the number average molecular weight is less than 50, the elongation and strength of the cured product obtained are insufficient in some cases. In the case where the number average molecular weight is greater than 20000, a cured product has a high viscosity and lowered workability in some cases.

Hydroxyl value of the polyol (A) is obtained with the method based on the standard of JIS K 1557-1.

As the constituent of the curable composition of the present invention, the amount of the polyol (A) is preferably not less than 10% by mass, more preferably not less than 15% by mass, even preferably not less than 20% by mass, and especially preferably not less than 25% by mass of the total amount of the curable composition. The amount of the polyol (A) is preferably not more than 90% by mass, more preferably not more than 85% by mass, and even preferably not more than 80% by mass of the total amount of the curable composition. In the case of less than 10% by mass and more than 90% by mass, the elongation and strength of the cured product obtained are insufficient in some cases.

The amount of the polyol (A) is preferably not less than 25% by mass, more preferably not less than 30% by mass, even preferably not more than 35% by mass, and especially preferably not less than 40% by mass of the total amount excluding the inorganic component from the curable composition. The amount of the polyol (A) is preferably not more than 95% by mass, more preferably not more than 90% by mass, and even preferably not more than 85% by mass of the total amount excluding the inorganic component from the curable composition. In the case of less than 25% by mass and more than 95% by mass, the elongation and strength of the cured product obtained are insufficient in some cases.

The polyol (A) may comprise a single component or two or more components. It is preferred that the polyol (A) contains both of a polyol (A-i) for dispersing polymer fine particles (C) which has an average hydroxyl value of 1 to 300 mgKOH/g and a polyol (A-ii) for addition which is different from the polyol (A-i) for dispersing polymer fine particles (C), from the viewpoint of a maximum tensile stress and an elongation at the maximum tensile stress.

In the present application, the polyol that is used for the dispersion of polymer fine particles (C) is defined as polyol and the polyol that is not used for the dispersion of polymer fine particles (C) is defined as polyol (A-ii).

The polyol (A-i) is more preferably a polyol having an average hydroxyl value of 120 mgKOH/g or less, even preferably a polyol having an average hydroxyl value of 110 mgKOH/g or less, even more preferably a polyol having an average hydroxyl value of 100 mgKOH/g or less. If the average hydroxyl value of the polyol (A-i) is high, the properties of the polymer fine particles each having a core-shell structure may not be exerted. The polyol (A-i) may be a bifunctional polyol or a trifunctional or higher polyol, and is preferably a bifunctional polyol, and is more preferably a bifunctional polyether polyol from the viewpoint of the viscosity of the composition.

The polyol (A-ii) may be the same as or different from the polyol (A-i). The polyol (A-ii) is preferably a polyol having an average hydroxyl value of 1 to 2000 mgKOH/g, more preferably a polyol having an average hydroxyl value of 1 to 1700 mgKOH/g, even preferably a polyol having an average hydroxyl value of 1 to 1500 mgKOH/g, even more preferably a polyol having an average hydroxyl value of 1 to 1300 mgKOH/g, from the viewpoint of the hardness of the polyurethane. When the polyol (A-ii) contains a polyol having a high average hydroxyl value, it becomes possible to increase the maximum tensile stress, the elongation at the maximum tensile stress and the durometer hardness of the cured product. The polyol (A-ii) may be a bifunctional polyol or a trifunctional or higher polyol, and a combination of the two polyols may be used.

The polyol (A-i) is contained in an amount of preferably 5 to 80% by mass, more preferably 10 to 70% by mass, and even more preferably 20 to 60% by mass, per 100% by mass of the curable composition.

The polyol (A-i) is contained in an amount of preferably 10 to 60% by mass, more preferably 20 to 50% by mass, and even more preferably 25 to 40% by mass, per 100% by mass of a dispersion of the polyol (A-i) and the polymer fine particles (C).

The polyol (A-ii) is contained in an amount of preferably 10 to 90% by mass, more preferably 20 to 80% by mass, and even preferably 30 to 70% by mass, per 100% by mass of the curable composition.

In the case where the polyol (A-ii) to be used contains two or more components, the polyol (A-ii) may contain a polyol having an average hydroxyl value of 1 to 300 mgKOH/g and a polyol (A-ii-2) having an average hydroxyl value of more than 300 mgKOH/g and 2000 mgKOH/g or less.

The polyol (A-ii-1) is contained in an amount of preferably 60 to 95% by mass, and more preferably 70 to 90% by mass, per 100% by mass of the polyol (A-ii).

The polyol (A-ii-2) is contained in an amount of preferably 5 to 40% by mass, and more preferably 10 to 30% by mass, per 100% by mass of the polyol (A-ii).

In the case where the polyol (A-ii-2) to be used contains two or more components, the polyol (A-ii-2) may comprise a polyol 1) having an average hydroxyl value of more than 300 mgKOH/g and 1000 mgKOH/g or less and a polyol having an average hydroxyl value of more than 1000 mgKOH/g and 2000 mgKOH/g or less.

The polyol (A-ii-2-1) is contained in an amount of preferably 55 to 90% by mass, and more preferably 60 to 85% by mass, per 100% by mass of the polyol (A-ii-2).

The polyol (A-ii-2-2) is preferably contained in an amount of 10 to 45% by mass, and more preferably 15 to 40% by mass, per 100% by mass of the polyol (A-ii-2).

The above-mentioned average hydroxyl value may be a hydroxyl value of the polyol (A-i) alone, the polyol (A-ii) alone, the polyol (A-ii-1) alone, the polyol (A-ii-2) alone, the polyol (A-ii-2-1) alone or the polyol (A-ii-2-2) alone.

<Polyisocyanate (B)>

The polyisocyanate (B) is used in the curable composition of the present invention. The polyisocyanate (B) may be used individually or in combination of two or more polyisocyanates. The polyisocyanate (B) is an essential component for reacting with the polyol (A) of the present invention and forming a polyurethane in the curable composition.

Conventionally known polyisocyanate compounds are used as the polyisocyanate (B). Conventionally known polyisocyanate compounds include a diisocyanate compound and a polyisocyanate compound other than the diisocynate compound. The diisocyanate compound includes, for example, an aliphatic diisocyanate compound, an alicyclic diisocyanate compound, an aromatic and aliphatic diisocyanate compound, an aromatic diisocyanate compound and the like. The concrete examples of these are exemplified below.

The aliphatic diisocyanate compound includes trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanate methyl caproate The alicyclic diisocyanate compound includes 1,3-cyclopentene diisocyanate, 1,4-cyclohexane diisocyanate, 1,3-cyclohexane diisocyanate, 3-isocyanate methyl-3,5,5-trimethylcyclohexylisocyanate, 4,4'-methylenebis (cyclohexylisocyanate), methyl-2,4-cyclohexane diisocyanate, methyl-2,6-cyclohexane diisocyanate, 1,3-bis(isocyanatemethyl)cyclohexane, 1,4-bis(isocyanatemethyl)cyclohexane, and isophorone diisocyanate.

The aromatic and aliphatic diisocyanate compound includes 1,3- or 1,4-xylylendiisocyanate or a mixture thereof, ω,ω'-diisocyanate-1,4-diethyl benzene, and 1,3- or 1,4-bis (1-isocyanate-1-methylethyl)benzene or a mixture thereof.

The aromatic disocyanate compound includes m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate.

The polyisocyanate compound other than the diisocyanate compound includes an aliphatic polyisocyanate compound, an alicyclic polyisocyanate compound, an aromatic and aliphatic polyisocyanate compound, an aromatic polyisocyanate compound, and the like. The concrete examples of these are exemplified below.

The aliphatic polyisocyanate compound includes lysine triisocyanate, 1,4,8-triisocyanate octane, 1,6,11-triisocyanate undecane, 1,8-diisocyanate-4-isocyanate methyl octane, 1,3,6-triisocyanate hexane, 2,5,7-trimethyl-1,8-diisocyanate-5-isocyanate methyl octane and the like.

The alicyclic polyisocyanate compound includes 1,3,5-triisocyanatecyclohexane, 1,3,5-trimethylisocyanatecyclohexane, 3-isocyanate methyl-3,3,5-trimethylcyclohexylisocyanate, 2-(3-isocyanatepropyl)-2,5-di(isocyanatemethyl)-bicyclo[2,2,1]heptane, 2-(3-isocyanatepropyl)-2,6-di(isocyanatemethyl)-bicyclo[2,2,1]heptane, 3-(3-isocyanatepropyl)-2,5-di(isocyanatemethyl)-bicyclo[2,2,1]heptane, 5-(2-isocyanateethyl)-2-isocyanate methyl-3-(3-isocyanate propyl)-bicyclo[2,2,1]heptane, 6-(2-isocyanateethyl)-2-isocyanatemethyl-3-(3-isocyanate propyl)-bicyclo[2,2,1]heptane, 5-(2-isocyanateethyl)-2-isocyanatemethyl-2-(3-isocyanatepropyl)-bicyclo[2,2,1]heptane, 6-(2-isocyanateethyl)-2-isocyanatemethyl-2-(3-isocyanatepropyl)-bicyclo[2,2,1]heptane and the like.

The aliphatic and aromatic polyisocyanate compound includes 1,3,5-triisocyanate methyl benzene and the like.

The aromatic polyisocyanate compound includes triphenylmethane-4,4',4"-triisocyanate, 1,3,5-triisocyanate benzene, 2,4,6-triisocyanatetolune, 4,4'-diphenylmethane-2,2',5,5'-tetraisocyanate, polymethylene polyphenyl polyisocyanate and the like.

Further, the polyisocyanate compound includes an allophanate-modified product, a biuret modified product, an isocyanurate modified product and the like, which are obtained by using various polyisocyanate compounds as mentioned above.

Among these, the aromatic diisocyanate compound and the aromatic and aliphatic polyisocyanate compound are preferable due to excellent adhesive property of the curable composition. Especially, 4,4'-diphenyl methane diisocyanate, 2,4- or 2,6-tolylene diisocyanate, and polymethylene polyphenyl polyisocyanate are preferable, and 4,4'-diphenyl methane diisocyanate is most preferable.

The aliphatic diisocyanate compound, the alicyclic diisocyanate compound, the aliphatic polyisocyanate, and the alicyclic polyisocyanate are preferable due to excellent weather resistance of obtained cured products. Among these, hexamethylene diisocyanate, isophorone diisocyanate and isocyanurate modified products thereof are preferable.

When yellow discoloration occurs during use of these polyisocyanate compounds, an aliphatic, an alicyclic, or an aromatic and aliphatic polyisocyanate is preferably used.

The polyisocyanate (B) of the present invention can be a blocked isocyanate obtained by masking an isocyanate group with a masking agent, and inactivating the isocyanate group at ambient temperature. In the blocked isocyanate masked with the blocking agent, the blocking agent is dissociated by heating (for example, 130 to 160° C.) or humidity to regenerate the isocyanate group. Therefore, the blocked isocyanate can be combined with the polyol (A) in one pack type heat or moisture curable composition.

The blocking agent includes an alcohol blocking agent, a phenol blocking agent, an oxime blocking agent, a triazole blocking agent, a caprolactam blocking agent and the like.

Preferred examples of the alcohol blocking agent include methanol, ethanol, propanol, hexanol, laurylalcohol, t-butanol, cyclohexanol and the like. Preferred examples of the phenol blocking agent include xylenol, naphthol, 4-methyl-2,6-di-t-butylphenol. Preferred examples of the oxime blocking agent include 2,6-dimethyl-4-heptanone oxime, methylethylketoxime, 2-heptanone oxime and the like. Preferred example of the triazole blocking agent includes 1,2,4-triazole and the like. Preferred example of the caprolactum blocking agent includes ε-caprolactum and the like.

3,5-dimethylpyrrazole and the like are used suitably. Among these, methanol, xylenol, and methylethylketoxime are preferable.

As the constituent of the curable composition of the present invention, the amount of the polyisocyanate (B) is preferably not less than 2% by mass, more preferably not less than 5% by mass, even preferably not less than 10% by mass, even more preferably not less than 15% by mass, even more preferably not less than 20% by mass, and especially preferably not less than 25% by mass of the total amount of the curable composition. The amount of the polyisocyanate (B) is preferably not more than 50% by mass, more preferably not more than 40% by mass, and even preferably not more than 30% by mass of the total amount of the curable composition. In the case of less than 2% by mass and more than 50% by mass, the elongation and strength of the cured product obtained is decreased in some cases.

The amount of the polyisocyanate (B) is preferably not less than 3% by mass, more preferably not less than 6% by mass, even preferably not less than 11% by mass, even more preferably not less than 25% by mass, even more preferably not less than 30% by mass, even more preferably more not less than 35% by mass, and especially preferably not less than 40% by mass of the total amount excluding the inorganic component from the curable composition. The amount of the polyisocyanate (B) is preferably not more than 55% by mass, more preferably not more than 45% by mass, and even preferably not more than 35% by mass of the total amount excluding the inorganic component from the curable composition. In the case of less than 3% by mass and more than 55% by mass, the elongation and strength of the cured product obtained is decreased in some cases.

<Prepolymer from Previous Reaction of Polyol (A) and Polyisocyanate (B)>

In the present invention, it is possible that the polyol (A) is reacted with the polyisocyanate (B) at the curing of the curable composition. Also, it is possible that a prepolymer obtained by previously reacting a part or all of the polyol (A) and the polyisocyanate (B) can be used in the curable composition. By using the urethane prepolymer, the control of reactivity of urethane reaction, the control of the mixing ratio of the two component curable composition, the adjustment of the viscosity of the curable composition and the suppression of the forming at curing are accomplished.

Thus, the curable composition may contain a urethane prepolymer produced from the reaction of the polyol (A) and the polyisocyanate (B).

A method for synthesizing a urethane prepolymer may be a conventional method. For example, the urethane prepolymer may be obtained by feeding a compound having two or more active hydrogens at a terminal of polyol and the like to a closed reactor equipped with a stirrer, a reflux condenser, a vacuum dehydration device, a nitrogen inlet, dehydrating the compound under reduced pressure, and formulating a isocyanate compound, and reacting the compound and the isocyanate compound under nitrogen streaming at 70 to 100° C. for 3 to 8 hours.

The urethane prepolymer having an isocyanate group can be obtained by adjusting the equivalent ratio (NCO/active hydrogen containing group) of isocyanate (NCO) group of the polyisocyanate (B) to the active hydrogen containing group of the polyol (A), to a value greater than 1. It is preferable that the curable composition contains a urethane prepolymer having the isocyanate group obtained from the range of 1.05 to 5.0 of the equivalent ratio. In the case of less than 1.05 of the equivalent ratio, the workability of the curable composition becomes difficult due to high viscosity of the prepolymer. In addition, in the case of greater than 5.0 of the equivalent ratio, the amount of forming may become much during the cure, and the strength of the cured product obtained may become small. The equivalent ratio (NCO/active hydrogen containing group) is more preferably 1.5 to 4.0, and even preferably 2.0 to 3.0.

By using the urethane prepolymer, it is possible that the curable composition in which all of active hydrogen-containing group of the polyol (A) is reacted is used as the one pack type humidity curable composition capable of curing from the reaction of the isocyanate group of the prepolymer with humidity of the atmosphere.

In addition, a urethane prepolymer having a hydroxyl group may be obtained by controlling the equivalent ratio to a value of less than 1. Concretely, it is preferable that the curable composition contains a urethane prepolymer obtained from the 0.2 to 0.95 of the equivalent ratio. In the case of more than 0.95 of the equivalent ratio, the workability of the curable composition becomes difficult due to high viscosity of the prepolymer. In addition, in the case of less than 0.2 of the equivalent ratio, the strength of the cured product obtained may become small. The equivalent ratio is more preferably 0.25 to 0.7, and even preferably 0.30 to 0.5.

The total amount of the polyol (A) and the polyisocyanate (B) is preferably 20% by mass or more, more preferably 30% by mass or more, even preferably 40% by mass or more, and particularly preferably 50% by mass or more, relative to the whole amount of the curable composition. The upper limit of the total amount of the polyol (A) and the polyisocyanate (B) is, for example, 95% by mass or less, preferably 90% by mass or less. If the total amount of the polyol (A) and the polyisocyanate (B) is less than 20% by mass or more than 95% by mass, the strength and adhesiveness of the resultant cured product may be deteriorated.

The total amount of the polyol (A) and the polyisocyanate (B) is preferably 50% by mass or more, more preferably 60% by mass or more, even preferably 70% by mass or more, and particularly preferably 80% by mass or more, relative to the whole mass of the curable composition excluding an inorganic component. In the curable composition excluding the inorganic components, the total amount of the polyol (A) and the polyisocyanate (B) is, for example, 97% by mass or less, and preferably 95% by mass or less. If the total amount of the polyol (A) and the polyisocyanate (B) is less than 50% by mass or more than 97% by mass, the strength or adhesiveness of the resultant cured product may be deteriorated.

<Polymer Fine Particle (C)>

The curable composition of the present invention contains polymer fine particles (C) having a core-shell structure including at least two layers of a core layer and a shell layer. An amount of the polymer fine particles (C) is 1 to 150 parts by mass per 100 parts by mass of a total amount of the polyol (A) and the polyisocyanate (B). A cured product obtained has excellent mechanical properties by adding the polymer fine particles (C).

The amount of the polymer fine particles (C) is preferably 2 to 70 parts by mass, more preferably 5 to 50 parts by mass, and particularly preferably 15 to 40 parts by mass, per 100 parts by mass of a total amount of the polyol (A) and the polyisocyanate (B) in the view of balance between ease in handling of the curable composition obtained and effects of improving mechanical properties of the cured product obtained.

The particle diameter of the polymer fine particles is not particularly limited, and the volume average particle diameter (Mv) is preferably 10 to 2000 nm, more preferably 50 to 800 nm, even preferably 100 to 600 nm, and especially preferably 200 to 400 nm in the view of industrial productivity and a viscosity of the curable composition. The volume average particle diameter of the polymer fine particles can be measured by using Microtrack URA 150 (manufactured by Nikkiso Co., Ltd.).

In the composition of the present invention, the polymer fine particles (C) preferably have half value width of 0.5 times or more and 1 time or less the volume average particle diameter in the number particle size distribution, because the curable composition obtained has lower viscosity and is handled easily.

The polymer fine particles (C) have preferably the maximal of two or more in the number particle size distribution in the view of easily realizing a given particle size distribution, more preferably the maximal of two or three, and even preferably the maximal of two in the view of the working and cost during manufacture. Especially, it is preferable that the polymer fine particles (C) contain polymer fine particles having the volume average particle diameter of not less than 10 nm and less than 150 nm in an amount of 10 to 90% by mass and polymer fine particles having the volume average particle diameter of not less than 150 nm and not more than 2000 nm in an amount of 90 to 10% by mass.

It is preferable that the polymer fine particles (C) are dispersed in the curable composition at a state of the primary particle. In the present invention, "the polymer fine particles are dispersed in the curable composition at a state of the primary particle" (hereinafter referred to as primary dispersion in some cases) mean that the polymer fine particles are substantially dispersed individually (without contacting each other). The dispersion state of the polymer fine particles can be confirmed by dissolving a part of the curable composition in a solvent such as methylethylketone, and measuring the particle diameter by using a particle diameter measuring device with laser beam scattering and the like.

Stable dispersion of the polymer fine particles means that the polymer fine particles are dispersed for a long period under general conditions without aggregating, separating and precipitating in the continuous layer. In addition, the distribution of the polymer fine particles substantially do not change in the continuous layer, and "stable dispersion" can be maintained even when the composition containing the polymer fine particles is heated in the range of no danger so as to stir the composition and lower the viscosity of the composition. The polymer fine particles (C) may be used individually or in combination of two or more kinds.

The polymer fine particles (C) necessarily have a core-shell structure including at least two layers of a core layer and a shell layer. In addition, the polymer fine particles (C) can have a structure having three or more layers composed of a core layer, an intermediate layer coated on the core layer, and a shell layer coated on the intermediate layer. Hereinafter, each layer of the polymer fine particles is concretely explained.

<Core Layer>

The core layer in the present invention preferably contains a polymer produced by polymerizing a monomer mixture containing a non-crosslinking monomer and optionally a crosslinking monomer by at least one process selected from the group consisting of emulsion polymerization, suspension polymerization and microsuspension polymerization.

In order to increase the mechanical strength of a cured product produced by curing the curable composition according to the present invention, it is essential for the core layer to have a glass transition temperature (Tg) of higher than 0° C., which is calculated on a Kelvin temperature scale in accordance with numeral formula (1) and then converted the resultant temperature value to a temperature value on a Celsius temperature scale.

$$1/Tg = \Sigma(M_i/Tg_i) \quad (1)$$

(wherein $M_i$ represents a weight fraction of a non-crosslinking monomer i constituting the core layer of the polymer fine particles (C); $Tg_i$ represents a glass transition temperature (K) of a homopolymer polymerized with the non-crosslinking monomer i; and i represents an integer of 1 or more).

The glass transition temperature of the homopolymer polymerized with the non-crosslinking monomer can be confirmed from, for example, a document or a catalog, such as "POLYMER HANDBOOK (Fourth Edition)" written by J. Brandrup.

The upper limit of the glass transition temperature of the core layer in the polymer fine particles (C) as calculated in accordance with numeral formula (1) is not particularly limited, and is preferably 300° C. or lower from the viewpoint of availability. The glass transition temperature of the core layer is more preferably 15 to 200° C., even preferably 30 to 150° C., and particularly preferably 50 to 110° C.

The core layer is preferably a (meth)acrylate obtained by polymerizing with a (meth)acrylate monomer as a main component, and more preferably a methacrylate polymer in the lower viscosity of the curable composition.

It is preferable that a crosslinked structure is introduced in the polymer of the core layer in the view of retaining the dispersion stability of the polymer fine particles in the curable composition. In addition, it is preferable that the introduction of the crosslinked structure tends to decrease a viscosity of the curable composition of the present invention and increase strength of the cured product obtained by curing. As methods for introducing the crosslinked structure, a conventional method can be used. A method for introducing the crosslinked structure to the polymer polymerized with the above monomer(s) includes a method for copolymerizing a non-crosslinking monomer and a crosslinking monomer such as a multifunctional monomer and a mercapto group-containing compound and the like.

The core layer may be a polymer obtained by polymerizing only a non-crosslinking monomer and therefore does not have a crosslinked structure. The core layer is preferably a polymer having a crosslinked structure polymerized with 80 to 99% by mass of a non-crosslinking monomer and 20 to 1% by mass of a crosslinking monomer, more preferably a polymer having a crosslinked structure polymerized with 90 to 98% by mass of a non-crosslinking monomer and 10 to 2% by mass of a crosslinking monomer, even more preferably a polymer having a crosslinked structure polymerized with 94 to 97% by mass of a non-crosslinking monomer and 6 to 3% by mass of a crosslinking monomer.

A concrete example of the non-crosslinking monomer includes alkyl (meth)acrylates such as methyl(meth)acrylate, ethyl(meth)acrylate, butyl(meth)acrylate, 2-ethylhexyl (meth)acrylate, octyl(meth)acrylate, dodecyl(meth)acrylate, stearyl(meth)acrylate, isobornyl (meth) acrylate, dicyclopentanyl (meth) acrylate, 1-adamantyl (meth) acrylate, behenyl(meth)acrylate; aromatic ring-containing (meth) acrylates such as phenoxy ethyl (meth)acrylate, benzyl (meth)acrylate; hydroxyalkyl (meth)acrylates such as 2-hydroxyethyl(meth)acrylate, 4-hydroxybutyl(meth)acrylate; glycidyl (meth) acrylates such as glycidyl (meth) acrylate and glycidyl alkyl (meth) acrylate; alkoxyalkyl(meth)acrylates; vinyl arenes such as styrene, α-methylstyrene, monochlorostyrene, dichlorostyrene, 2-vinyl naphthalene, 3-methylstyrene, 4-methylstyrene, 2,4-dimethylstyrene, 2,5-dimethylstyrene, 3,5-dimethylstyrene, 2,4,6-trimethylstyrene, 4-methoxystyrene, 4-ethoxystyrene, 4-acetoxystyrene, 4-hydroxystyrene; vinyl esters such as vinyl benzoate, vinylcyclohexanoate; acrylamides such as acrylamide, isopropylacrylamide, N-vinylpyrrolidone; vinyl carboxylic acids such as acrylic acid, methacryloc acid; vinyl cyanides such as acrylonitrile, methacrylonitrile; halogenated vinyls such as chloro vinyl, bromo vinyl, chloroprene; vinyl acetate; alkenes such as ethylene, propylene, butylene, isobutylene, and the like. These may be used individually or in combination of two or more (meth) acrylate monomers. Among these, alkylmethacrylates of 1 to 4 carbons, vinyl areanes, vinyl cyanides are preferable in the viewpoint of ease of availability and high Tg of the polymer. Alkylmethacrylate of 1 to 5 carbons such methylmethacrylate, ethylmethacrylate, isopropylmethacrylate, isobutylmethacrylate, n-butylmethacrylate, t-butylmethacrylate, vinyl arenes of 6 to 15 carbons such as styrene, α-methylstyrene, acrylonitrile are particularly preferable in the viewpoint of ease of availability and high Tg of the polymer. Methylmethacrylate, ethylmethacrylate, isopropylmethacrylate, isobutylmethacrylate, n-butylmethacrylate, t-butylmethacrylate are most preferable.

When the core layer is a crosslinked polymer, a gel content of the core layer is preferably 60% by mass or more, more preferably 80% by mass or more, even preferably 90% by mass or more, and particularly preferably 95% by mass or more. The gel content is obtained as follows. 0.5 g of the polymer fine particles obtained by coagulation and dry is immersed in 100 g of toluene and stands at 23° C. for 24 hours, soluble content and insoluble content are separated, and a ratio of insoluble content to the total content of insoluble content and soluble content is calculated to obtain the gel content.

The multifunctional monomer includes allylalkyl(meth)acrylates such as allyl(meth)acrylate, allylalkyl(meth)acrylate; allyloxyalkyl(meth)acrylates; multifunctional(meth)acrylates having two or more (meth)acrylic groups such as (poly)ethyleneglycol di(meth)acrylate, butanediol di(meth)acrylate, ethyleneglycol di(meth)acrylate, triethyleneglycol di(meth)acrylate, tetraethylene glycol di(meth)acrylate; conjugate diene monomers such as 1,3-butadiene, isoprene, 2-chloro-1,3-butadiene, 2-methyl-1,3-butadiene, diallyl phthalate, triallylcyanurate, triallylisocyanurate, divinylbenzene and the like. Allylmethacrylate, triallyl isocyanurate, butanediol di(meth)acrylate and divinyl benzene are especially preferable. The multifunctional monomer may be used individually or in the combination of two or more monomers. The mercapto group-containing compound includes pentaerythritoltetrakis(3-mercaptopropyonate), tris-[(3-=captopropionyloxy)-ethyl]-isocyanurate, trimethylolpropanetris(3-=captopropyonate), mercaptopropyldimethoxymethylsilane, mercaptopropyltrimethoxysilane, and the like.

Examples of the combination of the non-crosslinking monomer and the crosslinking monomer include: a combination of 80 to 99% by mass of methyl methacrylate and 1 to 20% by mass of allyl methacrylate; a combination of 60 to 85% by mass of methyl methacrylate, 5 to 20% by mass of butyl acrylate and 5 to 20% by mass of allyl methacrylate; a combination of 40 to 80% by mass of methyl methacrylate, 10 to 40% by mass of butyl methacrylate, and 10 to 20% by mass of allyl methacrylate; and a combination of 50 to 80% by mass of methyl methacrylate, 10 to 25% by mass of styrene and 10 to 25% by mass of allyl methacrylate.

The volume average particle diameter of the core layer is preferably 0.03 to 2 μm and more preferably 0.05 to 1 μm.

It is difficult to stably obtain a core layer having the volume average particle diameter of less than 0.03 μm in many cases. In the case of the volume average particle diameter of greater than 2 the strength of the cured product obtained by curing the curable composition is lowered in some cases. The volume average particle diameter can be measured by using Microtrac URA 150 (manufactured by Nikkiso Co., Ltd).

The amount of the core layer is preferably 40 to 97% by mass, more preferably 60 to 95% by mass, even preferably 70 to 93% by mass, and especially preferably 80 to 90% by mass of 100% by mass of the whole polymer fine particles. In the case of the core layer of less than 40% by mass, mechanical strength of the cured product may be lowered. In the case of the core layer of more than 97% by mass, the polymer fine particles are easily aggregated, and the handling of the curable composition may become difficult due to high viscosity.

In the present invention, the core layer may be composed of monolayer in some cases, and may be composed of multilayers. In the case where the core layer is composed of multilayer, the polymer composition of each layer may be different each other.

<Intermediate Layer>

An intermediate layer may be famed between the core layer and the shell layer. Especially, the intermediate layer may be famed as a surface-crosslinked layer as set forth below.

The surface-crosslinked layer contains a polymer polymerized with a surface-crosslinked layer composition containing 30 to 100% by mass of a multifunctional monomer having two or more radical double bonds in the same molecule and 0 to 70% by mass of other vinyl monomer. The surface-crosslinked layer has effects of lowering the viscosity of the curable composition of the present invention, and improving the dispersibility of the polymer fine particles (C) to the polyol (A) or the polyisocyanate (B). In addition, the surface-crosslinked layer has an effect of improving crosslink density of the core layer and graft efficiency of the shell layer.

The concrete example of the multifunctional monomer is exemplified by the same monomer as the above multifunctional monomer, and the multifunctional monomer is preferably allyl methacrylate and triallyl isocyanurate.

<Shell Layer>

The shell layer existing at outermost of the polymer fine particles is a polymer polymerized with a monomer for forming the shell layer. The shell layer is composed of a polymer for improving the compatibility of the polymer fine particles (C) and the polyol (A) or the polyisocyanate (B) and dispersing the polymer fine particles in the state of primary particle in the curable composition or the cured product obtained therefrom of the present invention.

The shell polymer for forming the shell layer is preferably grafted on the core layer. More precisely, it is preferable that a monomer used in the formation of the shell layer is graft-polymerized on the core polymer for forming the core layer, and the shell polymer layer is chemically bonded to the rubber core layer. It is preferable that the shell polymer is formed by graft-polymerizing the monomer for forming the shell layer under the presence of the core polymer, and a part or all of the core polymer is covered with the shell polymer. Such a polymerization can be carried out by adding a monomer for constituting the shell polymer to a latex containing the core polymer prepared in the state of an aqueous latex, and polymerizing the monomer and the core polymer.

The monomer for forming the shell layer is preferably an aromatic vinyl monomer, a vinyl cyanide monomer, a (meth) acrylate monomer, a monomer having a hydroxyl group, and more preferably the (meth) acrylate monomer, the monomer having the hydroxyl group in the view of the compatibility and the dispersibility of the polymer fine particle (C) of the curable composition. It is preferable that the shell layer is preferably a (meth)acrylate polymer polymerized with a (meth)acrylate monomer as a main component, and more preferably a methacrylate polymer in the viewpoint of lowering a viscosity of the curable composition.

The monomer for forming the shell layer preferably contains a monomer having one or more reactive groups selected from the group consisting of an epoxy group, an oxetane group, a hydroxyl group, an amino group, an imide group, a carboxylic acid group, a carboxylic acid anhydride group, a cyclic ester, a cyclic amide group, a benzoxazine group, and a cyanate ester group in the view of the chemical bond of the polymer fine particles (C) to the polyol (A) or the polyisocyanate (B) in order to maintain the good dispersibility without coagulating the polymer fine particles (C) in the cured product and the polymer. The shell layer of the polymer fine particles (C) particularly preferably contains a hydroxyl group. The polymer fine particles (C) preferably have the shell layer graft-polymerized on the core layer, and the shell is polymerized with at least a monomer having a hydroxy group.

In addition, a multifunctional monomer having two or more double bonds is preferably used as a monomer for forming the shell layer because the swelling of the polymer fine particles is prevented in the curable composition, or the viscosity of the curable composition becomes lower to improve the handling.

The multifunctional monomer is contained in an amount of preferably 1 to 20% by mass, and more preferably 5 to 15% by mass of 100% by mass of a monomer for forming the shell layer.

The concrete example of the aromatic vinyl monomer includes styrene, α-methyl styrene, p-methyl styrene, divinyl benzene and the like.

Concrete example of the vinyl cyanide monomer includes acrylonitrile, and methacrylonitrile.

The concrete example of the (meth)acrylate monomer includes methyl(meth)acrylate, ethyl(meth)acrylate, butyl (meth)acrylate, and the like.

Concrete example of the monomer having an epoxy group includes glycidyl (meth) acrylate and the like.

The concrete example of the monomer having a hydroxyl group include a hydroxyl and alkyl-containing linear (meth) acrylate (especially, hydroxyl and C1-6 alkyl-containing linear (meth) acrylate) such as 2-hydroxyethyl(meth)acrylate, hydroxy propyl(meth)acrylate, 4-hydroxybutyl(meth) acrylate; a caprolacton-modified hydroxyl (meth)acrylate; a hydroxyl and alkyl-containing branched (meth)acrylate such as α-(hydroxymethyl)methylacrylate, α-(hydroxymethyl) ethylacrylate; a hydroxyl group-containing (meth)acrylate such as a mono(meth) acrylate of polyesterdiol (especially, saturated polyesterdiol) obtained from dibasic carboxylic acid (for example, phthalic acid) and dihydric alcohol (for example, propylene glycol).

Concrete example of the multifunctional monomer having two or more double bonds is exemplified by the same monomer as the above-mentioned multifunctional monomer. The multifunctional monomer is preferably allylmethacrylate and triallylisocyanurate. These monomer components may be used individually or in the combination of two or more components.

The shell layer may be formed with other monomer except the above-mentioned monomer. Other monomer includes, for example, (meth) acrylamide derivative, maleimide derivative, vinyl ether and the like.

The (meth) acrylamide derivative includes (meth) acrylamide including N-substituted compound. The maleimide derivative includes maleic acid imide including N-substituted compound and the like. The vinylether includes glycidylvinyl ether, allylvinyl ether and the like.

The monomer for forming the shell layer may be the combination of methylmethacrylate, butylacrylate, 4-hydroxybutylacryalte, and styrene, or methylmethacrylate, butylacrylate, and styrene, and butylacrylate may be a main component, that is, 50% by mass or more of 100% by mass of the monomer(s) for forming the shell layer.

The shell layer of the polymer fine particles (C) has a hydroxyl group in an amount of preferably 0.05 to 3.5 mmol/g, more preferably 0.1 to 2.0 mmol/g, even preferably 0.2 to 1.0 mmol/g, and particularly preferably 0.3 to 0.7 mmol/g. If the content of hydroxyl groups in the shell layer is less than 0.05 mmol/g, the compatibility with a polyol is insufficient and therefore the viscosity of the curable composition may be increased. Furthermore, the mechanical strength of a cured product foiled from the curable composition may be deteriorated. If the content of hydroxyl groups in the shell layer is more than 3.5 mmol/g, the polymerization system becomes unstable and aggregation or coagulation may occur.

The graft rate of the shell layer is preferably 70% or more, more preferably 80% or more, and even preferably 90% or more. In the case of less than 70%, the viscosity of the curable composition may be increased. Incidentally, the method of calculating the graft rate is as follows.

The powder of the polymer fine particles is obtained by coagulating and dehydrating the aqueous latex containing the polymer fine particles, and drying the polymer fine particles. Then, 2 g of the powder of the polymer fine particles is immersed in 100 g of methylethylketone (MEK) at 23° C. for 24 hours, separated in MEK soluble content and MEK insoluble content, and separated methanol insoluble content from MEK soluble content. Thus, the graft ratio is calculated by determining a ratio of MEK insoluble content to the total content of MEK insoluble content and methanol insoluble content.

<Method for Preparing Polymer Fine Particles>
(Method for Preparing Core Layer)

The core layer of the polymer fine particles used in the present invention is obtained by polymerizing a monomer for forming the core layer with one or more methods selected from emulsion polymerization, suspension polymerization, micro-suspension polymerization and the like, and methods described in WO2005/028546 can be used.

(Method of Forming Shell Layer and Intermediate Layer)

The intermediate layer can be obtained by polymerizing a monomer for forming the intermediate layer with one or more methods selected from emulsion polymerization, suspension polymerization, and micro-suspension. In the case where the core layer is obtained as an emulsion, it is preferable that the polymerization of the monomer for forming the intermediate layer is carried out with the emulsion polymerization.

The shell layer can be obtained by polymerizing a monomer for forming the shell layer with one or more methods selected from emulsion polymerization, suspension polymerization, and micro-suspension. In the case where a polymer particle precursor constituting the core layer or the core layer covered with the intermediate layer is obtained as an emulsion, it is preferable that the polymerization of the monomer for forming the shell layer is carried out with the emulsion polymerization, and the shell layer can be prepared according to methods of WO2005/028546.

The following dispersants can be mentioned as examples of emulsifiers (dispersants) usable in the emulsion polymerization: various acids including alkyl or aryl sulfonic acids such as dioctylsulfosuccinic acid and dodecylbenzenesulfonic acid, alkyl or arylether sulfonic acids, alkyl or arylsulfuric acids such as dodecylsulfuric acids, alkyl or arylether sulfuric acids, alkyl or aryl-substituted phosphoric acids, alkyl or arylether-substituted phosphoric acids, N-alkyl or arylsarcosinic acids such as dodecylsarcosinic acid, alkyl or arylcarboxylic acids such as oleic acid and stearic acid, and alkyl or arylether carboxylic acids, and anionic emulsifiers (dispersants) such as alkali metal salts or ammonium salts of these acids; nonionic emulsifiers (dispersants) such as alkyl or aryl-substituted polyethylene glycols; and derivatives of polyvinyl alcohol, alkyl-substituted celluloses, polyvinyl pyrrolidone, and polyacrylic acid. Any of these emulsifiers (dispersants) may be used alone, or two or more of these may be used in combination.

The amount of the emulsifier (dispersant) is preferably as small as possible, but the dispersion stability of the polymer fine particles in the aqueous latex should be secured. The emulsifier (dispersant) preferably has as high water solubility as possible. An emulsifier (dispersant) having high water solubility can be easily washed out with water, and thus its bad influence on the final cured product can be easily avoided.

In the case of adopting emulsion-polymerization, as known initiators, thermal decomposition initiator such as 2,2'-azobisisobutylonitrile, hydrogen peroxide, potassium persulphate, ammonium persulfate can be used.

In addition, redox type initiators of peroxides such as organic peroxides (e.g. t-butylperoxy isopropyl carbonate, p-menthane hydroperoxide, cumene hydroperoxide, dicumyl peroxide, t-butyl hydroperoxide, di-t-butyl peroxide, t-hexyl peroxide, etc.) and inorganic peroxides (e.g. hydrogen peroxide, potassium persulfate, ammonium persulfate, etc.) in combination with reducing agents (e.g. sodium formaldehyde sulfoxylate, glucose, etc.) as needed and transition metal salts (e.g. ferrous sulfate, etc.) as needed, chelating agents (e.g. disodium ethylenediaminetetraacetate, etc.) as needed, or further phosphorus-containing compounds (e.g. sodium pyrophosphate, etc.) as needed can also be used.

In the case of polymerization using a redox type initiator, it is possible to carry out the polymerization even at a low temperature at which the peroxide does not cause substantially thermal decomposition and to set the polymerization temperature in a wide range, and therefore such a polymerization is preferable. Above all, organic peroxides such as cumene hydroperoxide, dicumyl peroxide, and t-butyl hydroperoxide are preferably used as a redox type initiator. The amount of the initiator or the amount of the reducing agent/transition metal salt/chelating agent when a redox-type initiator is used can be used in the range known in the art. Also, when a monomer having two or more double bonds is polymerized, a known chain transfer agent can be used in the known range. It is possible to additionally use a surfactant, and such use of the surfactant is also included in the known range.

The conditions to be applied in the polymerization, such as polymerization temperature, pressure, and deoxidation, are those known in the art. In addition, polymerization of the monomer for intermediate layer formation may be carried out in one stage or in two or more stages. Such polymerization includes, for example, a method of adding a monomer for intermediate layer formation at one time to an emulsion of a rubber elastic body constituting an elastic core layer, a method of continuously adding a monomer for intermediate layer formation to an emulsion of a rubber elastic body constituting an elastic core layer, and, in addition, a method of carrying out polymerization after adding an emulsion of a rubber elastic body constituting an elastic core layer to a reactor into which a monomer for forming intermediate layer has previously been charged.

In the present invention, the curable composition is a polyurethane curable composition containing a polyol (A) and a polyisocyanate (B) as essential components. The polyurethane curable composition additionally contains polymer fine particles (C) each having a core-shell structure having at least two layers of a core layer and a shell layer. The polymer fine particles (C) are contained in an amount of 1 to 150 parts by mass relative to 100 parts by mass of a total amount of the polyol (A) and the polyisocyanate (B). The core layer of the polymer fine particles (C) has a glass transition temperature (Tg) of more than 0° C. as determined in accordance with numeral formula (1).

$$1/Tg = \Sigma(M_i/Tg_i) \qquad (1)$$

(wherein $M_i$ represents a weight fraction of a non-crosslinking monomer i constituting the core layer of the polymer fine particles (C); $Tg_i$ represents a glass transition temperature (K) of a homopolymer polymerized with the non-crosslinking monomer i; and i represents an integer of 1 or more).

In the curable composition, it is preferable that the polyol (A) contains both of a polyol (A-i) for dispersing the polymer fine particles (C) which has an average hydroxyl value of 1 to 300 mgKOH/g and a polyol (A-ii) for addition which is different from the polyol (A-i) for dispersing the polymer fine particles (C).

It is preferable that the curable composition contains a dispersion containing the polymer fine particles (C) having a hydroxyl group in the shell layer and the polyol (A-i) for dispersing the polymer fine particles (C), the polyol (A-ii) for addition, and the polyisocyanate (B).

It is more preferable that the curable composition contains a dispersion containing the polymer fine particles (C) having a hydroxyl group in the shell layer and the polyol (A-i) for dispersing the polymer fine particles (C) which has an average hydroxyl value of 1 to 300 mgKOH/g, the polyol (A-ii) for addition which has an average hydroxyl value of 1 to 2000 mgKOH/g, and the polyisocyanate (B), it is even preferable that the curable composition contains a dispersion containing the polymer fine particles (C) having a hydroxyl group in the shell layer and the polyol (A-i) for dispersing the polymer fine particles (C) which has an average hydroxyl value of 1 to 200 mgKOH/g, the polyol (A-ii-1) for addition which has an average hydroxyl value of 1 to 300 mgKOH/g, the polyol (A-ii-2) for addition which has an average hydroxyl value of more than 300 mgKOH/g and 2000 mgKOH/g or less, and the polyisocyanate (B), and it is even more preferable that the curable composition contains a dispersion containing the polymer fine particles (C) having a hydroxyl group in the shell layer and the polyol (A-i) for dispersing the polymer fine particles (C) which has an average hydroxyl value of 1 to 100 mgKOH/g, the polyol (A-ii-1) for addition which has an average hydroxyl value of 1 to 300 mgKOH/g, the polyol (A-ii-2-1) for addition which has an average hydroxyl value of more than 300 mgKOH/g and 1000 mgKOH/g or less, the polyol (A-ii-2-2) for addition which has an average hydroxyl value of more than 1000 mgKOH/g and 2000 mgKOH/g or less, and the polyisocyanate (B).

<Curing Catalyst (D)>

For the curable composition of the present invention, it is possible to use a curing catalyst as the component (D). The curing catalyst is not particularly limited, but includes a catalyst that is commonly used to promote the urethane reaction. Specific examples of the curing catalyst include metal salts of carboxylic acids such as tin 2-ethylhexanoate, tin versatate, bismuth 2-ethylhexanoate, potassium acetate, potassium octylate, lead octylate, lead naphthenate, nickel naphthenate, and cobalt octylate; tetravalent organic tin compounds such as dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltin bis(octyl maleate), dibutyltin bis(tridecyl maleate), dibutyltin bis(benzyl maleate), dibutyltin diacetate, dioctyltin bis (ethyl maleate), dioctyltin bis(octyl maleate), dibutyltin dimethoxide, dibutyltin bis(nonyl phenoxide), dibuteenyltin oxide, dibutyltin bis(acetylacetonate), dibutyltin bis(ethyl acetoacetate), dibutyltin bisisooctylthioglycolate, dibutyltin dichloride, dibutyltin oxide, a reaction product of dibutyltin oxide and a silicate compound, a reaction product of a dialkyltin dicarboxylate (e.g. dibutyltin dilaurate) and a silicate compound, and a reaction product of dibutyltin oxide and a phthalic acid ester; organic titanates such as tetraisopropoxy titanium, tetra-n-butoxy titanium, diisopropoxytitanium bis(acetylacetonate), and diisopropoxytitanium bis(ethylacetoacetate); organoaluminum compounds such as aluminum tris(acetylacetonate), aluminum tris(ethylacetoacetate), and diisopropoxyaluminum ethylacetoacetate; zirconium compounds, such as zirconium tetrakis (acetylacetonate); amine compounds such as triamylamine, trihexylamine, trioctylamine, triallylamine, triphenylamine, triethanolamine, triethylamine, tripropylamine, diethylethanolamine, dimethylaminoethoxyethanol, N,N,N'-trimethylaminoethylethanolamine, N,N,N',N'',N''-pentamethyldiethylenetriamine, N,N,N',N'-tetramethylhexamethylenediamine, N,N,N',N'-tetramethylethylenediamine, N,N',N'-trimethylaminoethylpiperazine, N,N-dimethylcyclohexylamine, bis(2-dimethylaminoethyl) ether, guanidine, diphenylguanidine, 2,4,6-tris(dimethylaminomethyl)phenol, N-methylmorpholine, N-ethylmorpholine, N-octadecylmoipholine, N-methylpiperazine, N-methyl-N'-(2-hydroxypropyl) piperazine, 2-ethyl-4-methylimidazole, 1,8-diazabicyclo(5,4,0)undecene (DBU), 1,5-diazabicyclo(4,3,0)nonene (DBN), and 1,4-diazabicyclo[2.2.2]octane (DABCO), and the like. Also, salts of the amine compounds with carboxylic acids or organic acids (e.g. phenols), such as octylic acid salt of DBU, are effective as latent curing catalysts.

The amount of the curing catalyst is preferably 0.001 to 5% by mass, more preferably 0.01 to 2% by mass, even preferably 0.05 to 1% by mass, and particularly preferably 0.1 to 0.5% by mass of 100% by mass of the total amount of the curable composition of the present invention. If the amount of the curing catalyst is less than 0.001% by mass, curing is slow in some cases. If the amount of the curing catalyst exceeds 5% by mass, curing is too fast, resulting in difficulty in handling sometimes.

<Filler>

A filler may be added to the curable composition of the present invention. The filler includes, for example, reinforcing fillers such as fumed silica, precipitated silica, crystalline silica, molten silica, dolomite, anhydrous silicic acid, hydrous silicic acid, and carbon black; fillers such as heavy calcium carbonate, colloidal calcium carbonate, magnesium carbonate, barium carbonate, barium sulfate, diatomaceous earth, baked clay, clay, talc, baryte, anhydrous gypsum, titanium oxide, bentonite, organic bentonite, ferric oxide, aluminum fine powder, flint powder, zinc oxide, active zinc flower, mica, zinc flower, white lead, lithopone, zinc sulfide, Shirasu Balloon, glass microballoon, organic microballoon of a phenol resin or a vinylidene chloride resin, and resin powder such as PVC powder and PMMA powder; fibrous fillers such as asbestos, glass fiber and filament, and the like.

In addition to the above, for example, colored pigments such as titanium oxide, carbon black, iron oxide, lead chromate, chromium oxide, ultramarine, cobalt blue, cyanine blue, cyanine green, lake red, and quinacridone red may also be used.

When the filler is used, the amount of the filler is preferably 1 to 250 parts by mass, more preferably 10 to 200 parts by mass of 100 parts by mass of the total amount of the polyol (A) and the polyisocyanate (B).

<Flame Retardant>

If necessary, a flame retardant such as a phosphorus-based plasticizer (e.g. ammonium polyphosphate and tricresyl phosphate), aluminum hydroxide, magnesium hydroxide, and a thermally expandable graphite, may be added to the curable composition of the present invention. The flame retardant may be used individually or in combination of two or more thereof.

As the ammonium polyphosphate, conventionally known ones can be widely used. Among these, from the viewpoint of water resistance, it is preferable to use a surface-treated ammonium polyphosphate such as ammonium polyphosphate which is coated with a resin and microencapsulated, and a surface-modified ammonium polyphosphate, and it is more preferable to use ammonium polyphosphate in which the surface is coated with a melamine-formaldehyde resin.

When the flame retardant is used, an amount of the flame retardant is preferably 5 to 200 parts by mass, and more preferably 10 to 100 parts by mass of 100 parts by mass of the total amount of the polyol (A) and the polyisocyanate (B).

<Dispersant>

If necessary, a dispersant may be added to the curable composition of the present invention. A pigment dispersed paste obtained by mixing and dispersing a dispersant and a pigment according to known methods may be incorporated into the curable composition of the present invention. A commercially available dispersant may be used. Examples of the commercially available dispersant include, for example, ANTI-TERRA (registered trademark)-U, ANTI-TERRA (registered trademark)-U100, ANTI-TERRA (registered trademark)-204, ANTI-TERRA (registered trademark)-205, DISPERBYK (registered trademark)-101, DISPERBYK (registered trademark)-102, DISPERBYK (registered trademark)-103, DISPERBYK (registered trademark)-106, DISPERBYK (registered trademark)-108, DISPERBYK (registered trademark)-109, DISPERBYK (registered trademark)-110, DISPERBYK (registered trademark)-111, DISPERBYK (registered trademark)-112, DISPERBYK (registered trademark)-116, DISPERBYK (registered trademark)-130, DISPERBYK (registered trademark)-140, DISPERBYK (registered trademark)-142, DISPERBYK (registered trademark)-145, DISPERBYK (registered trademark)-161, DISPERBYK (registered trademark)-162, DISPERBYK (registered trademark)-163, DISPERBYK (registered trademark)-164, DISPERBYK (registered trademark)-166, DISPERBYK (registered trademark)-167, DISPERBYK (registered trademark)-168, DISPERBYK (registered trademark)-170, DISPERBYK (registered trademark)-171, DISPERBYK (registered trademark)-174, DISPERBYK (registered trademark)-180, DISPERBYK (registered trademark)-182, DISPERBYK (registered trademark)-183, DISPERBYK (registered trademark)-184, DISPERBYK (registered trademark)-185, DISPERBYK (registered trademark)-2000, DISPERBYK (registered trademark)-2001, DISPERBYK (registered trademark)-2008, DISPERBYK (registered trademark)-2009, DISPERBYK (registered trademark)-2022, DISPERBYK (registered trademark)-2025, DISPERBYK (registered trademark)-2050, DISPERBYK (registered trademark)-2070, DISPERBYK (registered trademark)-2096, DISPERBYK (registered trademark)-2150, DISPERBYK (registered trademark)-2155, DISPERBYK (registered trademark)-2163, DISPERBYK (registered trademark)-2164, BYK (registered trademark)-P104, BYK (registered trademark)-P104S, BYK (registered trademark)-P105, BYK (registered trademark)-9076, BYK (registered trademark)-9077, BYK (registered trademark)-220S, ANTI-TERRA (registered trademark)-250, DISPERBYK (registered trademark)-187, DISPERBYK (registered trademark)-190, DISPERBYK (registered trademark)-191, DISPERBYK (registered trademark)-192, DISPERBYK (registered trademark)-193, DISPERBYK (registered trademark)-194, DISPERBYK (registered trademark)-198, DISPERBYK (registered trademark)-2010, DISPERBYK (registered trademark)-2012, DISPERBYK (registered trademark)-2015, DISPERBYK (registered trademark)-2090, DISPERBYK (registered trademark)-2091, DISPERBYK (registered trademark)-2095 (all in the foregoing manufactured by BYK-Chemie GmbH.), DISPARLON (registered trademark) 2150, DISPARLON (registered trademark) KS-860, DISPARLON (registered trademark) KS-873N, DISPARLON (registered trademark) 7004, DISPARLON (registered trademark) 1831, DISPARLON (registered trademark) 1850, DISPARLON (registered trademark) 1860, DISPARLON (registered trademark) DA-1401, DISPARLON (registered trademark) PW-36, DISPARLON (registered trademark) DA-1200, DISPARLON (registered trademark) DA-550, DISPARLON (registered trademark) DA-703-50, DISPARLON (registered trademark) DA-7301, DISPARLON (registered trademark) DN-900, DISPARLON (registered trademark) DA-325, DISPARLON (registered trademark) DA-375, DISPARLON (registered trademark) DA-234 (all in the foregoing manufactured by Kusumoto Chemicals, Ltd.), EFKAPOLYMER4550 (manufactured by EFKA Company), SOLSPERSE (registered trademark) 27000, SOLSPERSE (registered trademark) 41000, and SOLSPERSE (registered trademark) 53095 (all in the foregoing manufactured by Avecia Ltd.). Among these, ANTI-TERRA (registered trademark)-U100, DISPERBYK (registered trademark)-102, DISPERBYK (registered trademark)-106, DISPERBYK (registered trademark)-108, DISPERBYK (registered trademark)-109, DISPERBYK (registered trademark)-111, DISPERBYK (registered trademark)-116, DISPERBYK (registered trademark)-145, DISPERBYK (registered trademark)-180, DISPERBYK (registered trademark)-185, DISPERBYK (registered trademark)-2008, DISPERBYK (registered trademark)-2096, DISPERBYK (registered trademark)-2155, BYK (registered trademark)-P105, BYK (registered trademark)-9076, BYK (registered trademark)-9077, DISPERBYK (registered trademark)-191, DISPERBYK (registered trademark)-192, DISPERBYK (registered trademark)-2090, DISPERBYK (registered trademark)-2095, DISPARLON (registered trademark) DA-550, DISPARLON (registered trademark) DA-325, DISPARLON (registered trademark) DA-375, and DISPARLON (registered trademark) DA-234 are preferable because they have a high nonvolatile content.

The number average molecular weight of the dispersant is preferably 1000 to 100000. If the number average molecular weight of the dispersant is less than 1000, sufficient dispersion stability may not be obtained. If the number average molecular weight exceeds 100000, the viscosity is too high to handle in some cases. The number average molecular weight of the dispersant is more preferably 2000 to 50000, and even more preferably 4000 to 50000.

When the dispersant is used, the amount of the dispersant is preferably 0.1 to 10 parts by mass, more preferably 0.2 to 3 parts by mass, and even preferably 0.3 to 1 part by mass of 100 parts by mass of the total amount of the polyol (A) and the polyisocyanate (B).

<Defoaming Agent>

If necessary, a defoaming agent may be added to the curable composition of the present invention. As the defoaming agent, it is possible to use those which are commercially available. Examples of the commercially available defoaming agent include, for example, defoaming agents such as BYK (registered trademark)-051, BYK (registered trademark)-052, BYK (registered trademark)-053, BYK (registered trademark)-054, BYK (registered trademark)-055, BYK (registered trademark)-057, BYK (registered trademark)-1752, BYK (registered trademark)-1790, BYK (registered trademark)-060N, BYK (registered trademark)-063, BYK (registered trademark)-065, BYK (registered trademark)-066N, BYK (registered trademark)-067A, BYK (registered trademark)-077, BYK (registered trademark)-088, BYK (registered trademark)-141, BYK (registered trademark)-354, BYK (registered trademark)-392, BYK (registered trademark)-011, BYK (registered trademark)-012, BYK (registered trademark)-017, BYK (registered trademark)-018, BYK (registered trademark)-019, BYK (registered trademark)-020, BYK (registered trademark)-021, BYK (registered trademark)-022, BYK (registered trademark)-023, BYK (registered trademark)-024, BYK (registered trademark)-025, BYK (registered trademark)-028, BYK (registered trademark)-038, BYK (registered trademark)-044, BYK (registered trademark)-093, BYK (registered trademark)-094, BYK (registered trademark)-1610, BYK (registered trademark)-1615, BYK (registered trademark)-1650, BYK (registered trademark)-1730, and BYK (registered trademark)-1770 (all in the foregoing manufactured by BYK-Chemie GmbH.); acrylic defoaming agents such as DISPARLON (registered trademark) OX-880EF, DISPARLON (registered trademark) OX-881, DISPARLON (registered trademark) OX-883, DISPARLON (registered trademark) OX-883HF, DISPARLON (registered trademark) OX-70, DISPARLON (registered trademark) OX-77EF, DISPARLON (registered trademark) OX-60, DISPARLON (registered trademark) OX-710, DISPARLON (registered trademark) OX-720, DISPARLON (registered trademark) OX-720EF, DISPARLON (registered trademark) OX-750HF, DISPARLON (registered trademark) LAP-10, DISPARLON (registered trademark) LAP-20, and DISPARLON (registered trademark) LAP-30; silicone-based acrylic composite-type defoaming agents such as DISPARLON (registered trademark) OX-66 and DIS- PARLON (registered trademark) OX-715; vinyl-based defoaming agents such as DISPARLON (registered trademark) 1950, DISPARLON (registered trademark) 1951, DISPARLON (registered trademark) 1952, DISPARLON (registered trademark) P-410EF, DISPARLON (registered trademark) P-420, DISPARLON (registered trademark) P-450, DISPARLON (registered trademark) P-425, and DISPARLON (registered trademark) PD-7; and silicone-based defoaming agents such as DISPARLON (registered trademark) 1930N and DISPARLON (registered trademark) 1934 (all in the foregoing manufactured by Kusumoto Chemicals, Ltd.).

When the defoaming agent is used, the amount of the defoaming agent is preferably 0.05 to 10 parts by mass, more preferably 0.2 to 5 parts by mass, and even preferably 0.3 to 3 parts by mass of 100 parts by mass of the total amount of the polyol (A) and the polyisocyanate (B).

<Plasticizer>

A plasticizer may be added to the curable composition of the present invention as needed. By adding a plasticizer, the viscosity and the slump property of the curable composition, as well as the mechanical properties such as tensile strength, elongation and the like of the cured product obtained by hardening the composition can be adjusted. Examples of the plasticizer include phthalate esters such as dibutyl phthalate, diheptyl phthalate, di(2-ethylhexyl) phthalate, and butylbenzyl phthalate; non-aromatic dibasic acid esters such as dioctyl adipate, dioctyl sebacate, dibutyl sebacate, and isodecyl succinate; glycol esters such as diethylene glycol benzoate and dipentaerythritol hexanoate; aliphatic esters such as butyl oleate, and methyl acetyl ricinoleate; phosphate esters such as tricresyl phosphate and tributyl phosphate; trimellitic acid esters; chlorinated paraffins; hydrocarbon based oils such as alkyldiphenyl and partially hydrogenated terphenyl; process oils; epoxy plasticizers such as epoxidized soybean oil and benzyl epoxystearate.

Since the strength of the cured product formed from the curable composition is decreased as the amount of the plasticizer used is increased, it is preferable to reduce the amount of the plasticizer to be used, and such amount is preferably 100 parts by mass or less, more preferably 50 parts by mass or less, even preferably 30 parts by mass or less, and especially preferably 10 parts by mass or less of 100 parts by mass of the total amount of the polyol (A) and the polyisocyanate (B). It is most preferable for the curable composition to contain no plasticizer.

<Solvent>

If necessary, a solvent may be used for the curable composition of the present invention in order to reduce the viscosity of the composition, increase the thixotropy, and improve the workability. As the solvent, there is no particular limitation, and various compounds can be used. Specific examples of the solvent include hydrocarbon solvents such as toluene, xylene, heptane, hexane, petroleum-based solvents; halogen-based solvents such as trichloroethylene; ester-based solvents such as ethyl acetate and butyl acetate; ketone-based solvents such as acetone, methyl ethyl ketone, methyl isobutyl ketone; ether-based solvents; and silicone-based solvents such as hexamethylcyclotrisiloxane, octamethylcyclotetrasiloxane, and decamethylcyclopentasiloxane. When the solvent is used, from the problem of outside air pollution, the boiling point of the solvent is preferably 150° C. or more, more preferably 200° C. or more, and especially preferably 250° C. or more. These solvents may be used individually or in combination of two or more thereof.

However, if the amount of the solvent to be added is large, there are cases where influence on the environment and toxicity to human body are high, so that it is preferable to reduce the amount of solvent to be used. Therefore, the amount of the solvent is preferably 50 parts by mass or less, more preferably 30 parts by mass or less, and even preferably 10 parts by mass or less of 100 parts by mass of the total amount of the polyol (A) and the polyisocyanate (B). It is particularly preferable for the curable composition to contain no solvent.

<Tackifier>

A tackifier may be added to the curable composition of the present invention as needed. Although the tackifier is not particularly limited, commonly used one can be used irrespective of the state of a solid or a liquid at ordinary temperatures. Specific examples thereof include styrene based block copolymers and hydrogenated products thereof, phenol resins, modified phenol resins (for example, cashew oil-modified phenol resins, tall oil-modified phenol resins and the like), terpenephenol resins, xylene-phenol resins, cyclopentadiene-phenol resins, coumarone-indene resins, rosin-based resins, rosin ester resins, hydrogenated rosin ester resins, xylene resins, low molecular weight polystyrene-based resins, styrene copolymer resins, petroleum resins (for example, C5 hydrocarbon resins, C9 hydrocarbon resins, C5-C9 hydrocarbon copolymerized resins and the like), hydrogenated petroleum resins, terpene based resins, DCPD resins petroleum resins, and the like. These may be used individually or in combination of two or more thereof. As the styrene-based block copolymers and hydrogenated products thereof, there are exemplified styrene-butadiene-styrene block copolymers (SBS), styrene-isoprene-styrene block copolymers (SIS), styrene-ethylene-butylene-styrene block copolymers (SEBS), styrene-ethylenepropylene-styrene block copolymers (SEPS), styrene-isobutylene-styrene block copolymers (SIBS), and the like. These tackifiers may be used individually or in combination of two or more thereof.

When the tackifier is used, the amount of the tackifier is preferably 5 to 100 parts by mass, and more preferably 10 to 50 parts by mass of 100 parts by mass of the total amount of the polyol (A) and the polyisocyanate (B).

<Leveling Agent>

If necessary, a leveling agent may be added to the composition of the present invention. Commercially available products may be used as the leveling agent. Examples of the commercially available products include, for example, BYKETOL (registered trademark)-OK, BYKETOL (registered trademark)-SPECIAL, BYKETOL (registered trademark)-AQ, BYKETOL (registered trademark)-WS (all in the foregoing manufactured by BYK-Chemie GmbH.), DISPARLON (registered trademark) 1970, DISPARLON (registered trademark) 230, DISPARLON (registered trademark) LF-1980, DISPARLON (registered trademark) LF-1982, DISPARLON (registered trademark) LF-1983, DISPARLON (registered trademark) LF-1984, and DISPARLON (registered trademark) LF-1985 (all in the foregoing manufactured by Kusumoto Chemicals, Ltd.).

When the leveling agent is used, the amount of the leveling agent is preferably in a range of 0.05 to 10 parts by mass, more preferably in a range of 0.2 to 5 parts by mass, and even preferably in a range of 0.3 to 3 parts by mass of 100 parts by mass of the total amount of the polyol (A) and the polyisocyanate (B).

<Thixotropic Agent>

A thixotropic agent (anti-sagging agent) may be added to the curable composition of the present invention as needed in order to prevent sagging and to improve workability. Although the anti-sagging agent is not particularly limited, examples thereof include, for example, polyamide waxes; hydrogenated castor oil derivatives; metal soaps such as calcium stearate, aluminum stearate, and barium stearate, and the like. The fumed silica shown as the filler can also be used as a thixotropic agent. When a rubber powder having a particle size of 10 to 500 µm as disclosed in Japanese Unexamined Patent Application Publication No. Heill-349916 or an organic fiber as disclosed in Japanese Unexamined Patent Application Publication No. 2003-155389 is used, a composition having a high thixotropy and favorable workability may be obtained. These thixotropic agents (anti-sagging agents) may be used individually or in combination of two or more thereof.

When the thixotropic agent is used, the amount of the thixotropic agent is in the range of preferably 0.1 to 20 parts by mass per 100 parts by mass of the total amount of the polyol (A) and the polyisocyanate (B).

<Epoxy Resin>

An epoxy resin may be added to the curable composition of the present invention as needed. The examples of the epoxy resin include, for example, known epoxy resins such as bisphenol A type epoxy resins, bisphenol F type epoxy resins, novolak type epoxy resins, glycidyl ester type epoxy resins, hydrogenated bisphenol A (or F) type epoxy resins, glycidyl ether type epoxy resins, amino-containing glycidyl ether resins, and epoxy compounds obtained by addition reaction of bisphenol A (or F) or polybasic acids to these epoxy resins.

When the epoxy resin is used, the amount of the epoxy resin is within a range of 0.1 to 30 parts by mass of 100 parts by mass of the total amount of the polyol (A) and the polyisocyanate (B).

<Antioxidant>

An antioxidant (antiaging agent) may be added to the curable composition of the present invention as needed. When the antioxidant is used, heat resistance of the cured product can be enhanced. Examples of the antioxidant include, for example, hindered phenolic, monophenolic, bisphenolic, and polyphenolic antioxidants, and among these, hindered phenolic antioxidants are especially preferred. Similarly, hindered amine-based light stabilizers presented as TINUVIN (registered trademark) 622LD, TINUVIN (registered trademark) 144, CHIMASSORB (registered trademark) 944LD, and CHIMASSORB (registered trademark) 119FL (all in the foregoing manufactured by Ciba Specialty Chemicals Inc.); MARK LA-57, MARK LA-62, MARK LA-67, MARK LA-63 and MARK LA-68 (all in the foregoing manufactured by Asahi Denka Kogyo K.K.); and SANOL (registered trademark) LS-770, SANOL (registered trademark) LS-765, SANOL (registered trademark) LS-292, SANOL (registered trademark) LS-2626, SANOL (registered trademark) LS-1114, and SANOL (registered trademark) LS-744 (all in the foregoing manufactured by Sankyo Co., Ltd.) may be used.

When the antioxidant is used, the amount used is within the range of preferably 0.1 to 10 parts by mass, and more preferably 0.2 to 5 parts by mass of 100 parts by mass of the total amount of the polyol (A) and the polyisocyanate (B).

<Light Stabilizer>

A light stabilizer may be used to the curable composition of the present invention as needed. When the light stabilizer is used, photo-oxidative deterioration of the cured product can be prevented. Examples of the light stabilizer include preferably benzotriazole-based compounds, hindered amine-based compounds, and benzoate-based compounds. Among these, the hindered amine-based compounds are more preferred. In particular, it is preferred to use a tertiary amine-containing hindered amine-based light stabilizer for the improvement in storage stability of the composition. As the tertiary amine-containing hindered amine-based light stabilizer, there may be exemplified light stabilizers such as TINUVIN (registered trademark) 622LD, TINUVIN (registered trademark) 144, CHIMASSORB (registered trademark) 119FL (all in the foregoing manufactured by BASF); MARK LA-57, LA-62, LA-67, and LA-63 (all in the foregoing manufactured by ADEKA Corp.); and SANOL (registered trademark) LS-765, LS-292, LS-2626, LS-1114, and LS-744 (all in the foregoing manufactured by Sankyo Co., Ltd.).

When the light stabilizer is used, the amount of the light stabilizer is in a range of preferably 0.1 to 10 parts by mass, and more preferably 0.2 to 5 parts by mass of 100 parts by mass of the total amount of the polyol (A) and the polyisocyanate (B).

<Ultraviolet Absorber>

An ultraviolet absorber may be used in the curable composition of the present invention as needed. When the ultraviolet absorber is used, the surface weather resistance of the cured product can be improved. Examples of the ultraviolet absorber include benzophenone-based compounds, benzotriazole-based compounds, salicylate-based compounds, substituted tolyl-based compounds, and metal chelate-based compounds and the like. Benzotriazole-based compounds are particularly preferred.

When the ultraviolet absorber is used, the amount of the ultraviolet absorber is preferably within a range of 0.1 to 10 parts by mass, and more preferably within a range of 0.2 to 5 parts by mass of 100 parts by mass of the total amount of the polyol (A) and the polyisocyanate (B). Also, it is preferred that the phenolic- or hindered phenolic-based antioxidant, the hindered amine-based light stabilizer, and the benzotriazole-based ultraviolet absorber are used in combination.

<Silane Coupling Agent>

A silane coupling agent may be added to the curable composition of the present invention as needed. Such addition of the silane coupling agent can improve the adhesion. Specifically, as the silane coupling agent, there can be used isocyanate group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, (isocyanatomethyl)trimethoxysilane, (isocyanatomethyl)dimethoxymethylsilane, (isocyanatomethyl)triethoxysilane, and (isocyanatomethyl)diethoxymethylsilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γaminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N, N'-bis[3-(trimethoxysilyl) propyl]ethylenediamine; ketimine type silanes such as N-(1,3-dimethylbutylidene)-3-(triethoxysilyl)-1-propaneamine;

mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane, and mercaptomethyltriethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, γ-acryloyloxypropyltriethoxysilane, and methacryloyloxymethyltrimethoxysilane; halogen-containing silanes such as γ-chloropropyltrimethoxysilane; isocyanurate silanes such as tris(3-trimethoxysilylpropyl)isocyanurate, and the like. Additionally, derivatives prepared by modification of these compounds, such as amino-modified silyl polymers, silylated amino polymers, unsaturated aminosilane complexes, phenylamino long-chain alkylsilanes, aminosilylated silicones, silylated polyesters, and the like can also be used as the silane coupling agent. The reaction product of the silane coupling agent includes a reaction product of an aminosilane and an epoxysilane, a reaction product of an aminosilane and an isocyanatosilane, and a partial condensate of various kinds of silane coupling agents.

When the silane coupling agent is used, the amount of the silane coupling agent is preferably about 0.1 to 15 parts by mass, more preferably 0.5 to 10 parts by mass, and particularly preferably about 1 to 5 parts by mass of 100 parts by mass of the total amount of the polyol (A) and polyisocyanate (B). If the amount added is below this range, there are cases where the adhesiveness and storage stability of the curable composition are not sufficient. On the other hand, if the amount added exceeds this range, the strength of the cured product may decrease in some cases.

<Dehydrating Agent>

If necessary, a dehydrating agent may be added to the curable composition of the present invention. Water present in the composition can be removed by the addition of a dehydrating agent, thereby improving storage stability and foaming at the time of curing. Specific examples of the dehydrating agent include vinyltrimethoxysilane, calcium oxide, zeolite, p-toluenesulfonyl isocyanate, and oxazolidines such as 3-ethyl-2-methyl-2-(3-methylbutyl)-1,3-oxazolidine and the like. These can be used individually or in combination of two or more thereof.

When the dehydrating agent is used, the amount of the dehydrating agent is preferably about 0.1 to 20 parts by mass, more preferably about 0.5 to 10 parts by mass, and particularly preferably about 1 to 5 parts by mass of 100 parts by mass of the total amount of the polyol (A) and polyisocyanate (B).

The curable composition of the present invention is essentially the non-aqueous type curable composition, and foaming from the reaction of water and the polyisocyanate (B) is produced. A water content is preferably 1 part by mass or less, more preferably 0.1 parts by mass or less of 100 parts by mass of the total amount of the polyol (A) and the pokyisocyanate (B). It is most preferable for the curable composition to contain substantially no water.

<Other Compounded Components>

In the present invention, it is possible to use other compounded components as needed. As the other compounded components, there are exemplified hydrolysis stabilizers, titanate-based coupling agents, aluminate-based coupling agents, release agents, antistatic agents, lubricants, low shrinkage agents, silicone surfactants, and the like.

<Production of Curable Composition>

The curable composition of the present invention is a curable composition that is mainly composed of polyol (A) and polyisocyanate (B) and contains polymer fine particles (C). Such a composition is preferably a composition in which polymer fine particles (C) are dispersed in the state of primary particles.

Various methods can be used as a method of obtaining a composition in which polymer fine particles (C) are dispersed in the state of primary particles in the polyol (A) or polyisocyanate (B). For example, such a method includes a method of bringing polymer fine particles obtained in the state of an aqueous latex, into contact with the polyol (A) and then removing unnecessary components such as water and the like, and a method of once extracting polymer fine particles with an organic solvent and then mixing the extract with the polyol (A) to remove the organic solvent. However, it is preferred to use the method described in WO 2009/14037. Specifically, such a method includes a first step of mixing an aqueous latex containing polymer fine particles (C) (in particular, a reaction mixture after production of the polymer fine particles by emulsion polymerization) with an organic solvent having a solubility of 5% by mass or more and 40% by mass or less in water at 20° C. and further mixing the mixture with an excess of water to agglomerate the polymer fine particles; a second step of separating and collecting the agglomerated polymer fine particles (C) from the liquid phase and mixing the polymer fine particles with an organic solvent again to obtain an organic solvent solution containing the polymer fine particles (C); and a third step of further mixing the organic solvent solution with the polyol (A) and then distilling off the organic solvent, and this method is preferably used for the preparation of the composition.

The polyol (A) that is a liquid at 23° C. is preferable because the third step is easily performed. The term "liquid at 23° C." means that the softening point is 23° C. or less and means that the polyol (A) has a fluidity at 23° C.

Each of the polyol (A), the polyisocyanate (B), the curing catalyst (D) and the other compounded components as needed are further added to and mixed with the composition which has been obtained by the above steps and in which the polymer fine particles (C) are dispersed in the state of primary particles in the polyol (A), so that the curable composition of the present invention in which the polymer fine particles (C) are dispersed in the state of primary particles, is obtained. The curable composition may be used as one pack type moisture curable composition.

When each component is mixed, such mixing is performed in a known manner by using a mixer that is usually used, thereby producing the curable composition. The composition may be obtained by uniformly dispersing a variety of raw materials under reduced pressure if necessary, using a mixing vessel equipped with a stirring blade of a propeller-type/a paddle type, or a mixer such as a planetary mixer, a kneader, a Hobart mixer, a high speed mixer, a line mixer, a roll mill, a sand mill, an attritor, and a two-axis mixer. The viscosity of the mixture may be designed according to the coating method.

<Two Pack Type Curable Composition>

When the curable composition of the present invention is used as a two pack type or a multi-pack type, each component of the present invention is preferably divided into a first solution containing the polyisocyanate (B) and a second solution containing the polyol (A) and the polymer fine particles (C). Each component of the present invention is preferably divided into a first solution containing an isocyanate group-containing component <polyisocyanate (B) and/or an isocyanate group-containing urethane prepolymer obtained by reacting the polyol (A) with the polyisocyanate (B) at an equivalent ratio (NCO/active hydrogen-containing group) of more than 1> and as a second solution containing a hydroxyl group-containing component <polyol (A) and/or a hydroxyl group-containing urethane prepolymer obtained by reacting the polyol (A) with the polyisocyanate (B) at an equivalent ratio (NCO/active hydrogen-containing group) of less than 1, in a separate vessel, and is preferably used by mixing immediately before use.

In this case, the polymer fine particles (C), the curing catalyst (D), and the other compounded components other than the polyol (A), the polyisocyanate (B) and the urethane prepolymer, may be added to the first solution or the second solution. From the viewpoint of storage stability, two pack type curable composition comprising the first solution containing the polyisocyanate (B) and the second solution containing the polyol (A), the polymer fine particles (C), and the curing catalyst (D) is more preferable.

<Cured Product>

The present invention encompasses a cured product obtained by curing the curable composition. The cured product having the uniform dispersibility of the polymer fine particles can be easily obtained by curing the curable composition of the present invention having the dispersibility of the primary particle of the polymer fine particles. In addition, the cured product can be easily obtained because it is difficult for the polymer fine particles to swell and the viscosity of the curable composition is lower.

The cured product famed from the curable composition of the present invention is a polyurethane and a urethane bond is contained in a main backbone of the polymer in the cured product. The cured product of the present invention is essentially different from a material having a urethane bond at a side chain.

<Applications>

The curable composition of the present invention is preferably used for applications such as adhesives for structural adhesion, ink binders, wood chip binders, binders for rubber tip, foam chip binders, binders for casting, flooring materials, ceramics, solidifier for bedrock, automotive interior materials, general woodworking, furniture, interior, wall materials, and food packaging; coating materials; fiber-reinforced composite materials; and urethane foams for automotive sheets, automotive interior parts, sound-absorbing materials, damping materials, shock absorbers, thermal insulation materials, and flooring cushions for construction work.

Among them, the cured product obtained by curing the curable composition of the present invention is more preferably used in an adhesive and a coating material, and even preferably an adhesive due to high elongation and excellent mechanical strength.

<Structural Adhesive>

The curable composition of the present invention has good adhesion to various adherends, such as cold rolled steel, aluminum, fiberglass reinforced polyester (FRP), panels of cured products of thermosetting resins such as carbon fiber-reinforced epoxy resins, carbon fiber-reinforced thermoplastic resin sheet panels, sheet molding compounds (SMC), ABS, PVC, polycarbonates, polypropylene, TPO, wood, and glass and the like.

The curable composition of the present invention exhibits an excellent adhesion property and flexibility not only at a low temperature (about −20° C.) to normal temperature, but also even at a high temperatures (about 80° C.). Thus, a urethane resin adhesive composition of the present embodiment can be preferably used as a structural adhesive.

Therefore, structural adhesives using the curable composition of the present invention can be used as an adhesive for structural members, such as automotives and vehicles (Shinkansen, trains), civil engineering, architecture, building materials, woodworking, electricity, electronics, aircraft, and space industries, etc. In particular, as the automotive-related application, it may include adhesion of interior materials such as ceilings, doors, seats, etc. and adhesion of exterior materials such as automobile illumination lighting fixture (e.g. lamp) and side molding.

<Coating Material>

When the curable composition of the present invention is used as a coating material, the viscosity of the mixture is generally set to about 500 to 9,000 cps/25° C. in the case of using trowels or lakes, and to about 100 to 3,000 cps/25° C. in the case of using rollers or sprays. When the curable composition of the present invention is applied to, for example, floor or corridor, a general construction method for urethane coating flooring can be applied. For example, after applying a primer to the substrate which has been subjected to a base material adjustment, the curable composition of the present invention is uniformly coated using trowels, rollers, lakes, or spray guns, depending on the constructing conditions. After coating, curing proceeds to obtain a urethane paving film excellent in performance. Coating films obtained by curing the curable composition of the present invention are excellent in load resistance and abrasion resistance.

There is no particular limitation on the substrate at the time of coating with the curable composition of the present invention. Specific examples of the substrate include an inorganic substrate such as concrete wall, concrete slab, concrete block, CMU (Concrete Masonry Unit), mortar board, ALC board, gypsum board (Dens Glass Gold: manufactured by Georgia Pacific Co., Ltd.) and slate board; a wood substrate such as wood, plywood, and OSB (Oriented Strand Board); an organic substrate such as asphalt, modified bitumen, waterproof sheet (e.g. EPDM, TPO, etc.), plastic, FRP, and urethane foam insulation material; and a metal substrate such as metal panel.

A laminate obtained by curing the curable composition of the present invention after its application to a metal substrate or a porous substrate is particularly preferably due to excellent corrosion resistance to the substrate as well as crack resistance and load resistance.

Although there is no particular limitation on the method of applying a coating material with the curable composition of the present invention, known coating methods are employed with use of a trowel, lake, brush, roller, air spray, or airless spray.

Although there is no particular limitation on the use of coating materials using the curable composition of the present invention, such a coating material is used in automobiles, electric appliances, office machines, building materials, wood, coating floors, heavy anticorrosion, concrete anticorrosion, waterproofing membrane materials for rooftop/roof water proofing or corrosion resistance/underground waterproofing, electrodeposition coating materials, automobile repair, can coating, top coating, intermediate coating, undercoating, primers, highly weather-resistant coating materials, non-yellowing coating materials, and the like. When the coating material is used in coating floor materials or paving materials, it can be used in plant, laboratory, warehouse, and clean room.

The present application claims the benefit of priority to Japanese Patent Application Number 2015-242463 filed on Dec. 11, 2015. The entire contents of the specification of Japanese Patent Application Number 2015-242463 filed on Dec. 11, 2015 are hereby incorporated by reference.

EXAMPLES

Next, the present invention will be described in detail with reference to Examples and Comparative Example, but the present invention is not limited thereto, and the variation and the modification of the present invention without departing the gist described above and below are all included the technical scope of the present invention. In the following examples, "part(s)" and "%" mean "part(s) by mass" and "% by mass", respectively.
Evaluation Method First, the evaluation method of the curable composition produced by Examples and Comparative Examples is described below.
[1] Measurement of Volume Average Particle Diameter The volume average particle diameter (Mv) of the polymer fine particles dispersed in an aqueous latex was measured using a Microtrac UPA150 (manufactured by Nikkiso Co., Ltd.). The dispersed polymer fine particles were diluted with deionized water and were used as a measurement sample. The measurement was carried out by inputting the refractive indexes of water or methylethylketone and the respective refractive index of polymer fine particles, and adjusting the sample concentration in a range of a signal level of 0.6 to 0.8 for a measurement time of 600 seconds.
[2] Calculation of Glass Transition Temperature of Core Layer in Polymer Fine Particles (C)

The glass transition temperature of the core layer in the polymer fine particles (C) in the curable composition was calculated on a Kelvin temperature scale in accordance with numeral formula (1) and then converted the resultant temperature value to a temperature value on a Celsius temperature scale. The Tg values of homopolymers of non-crosslinking monomers used in the calculation were as follows: methyl methacrylate: 378 K, butyl acrylate: 218 K, butadiene: 188 K, butyl methacrylate: 293 K, and styrene: 373 K.

$$1/Tg = \Sigma(M_i/Tg_i) \quad (1)$$

(wherein $M_i$ represents a weight fraction of a non-crosslinking monomer i constituting the core layer of the polymer fine particles (C); $Tg_i$ represents a glass transition temperature (K) of a homopolymer polymerized with the non-crosslinking monomer i; and i represents an integer of 1 or more).
[3] Measurement of Viscosity The viscosity of the curable composition was measured using a digital viscometer model DV-II+Pro (manufactured by BROOKFIELD). The viscosity was measured at 50° C. or 25° C. at a shear rate of 5 ($s^{-1}$) using a spindle CPE-41.
[4] Measurement of Physical Properties of Cured Product A curable composition was poured into a space famed between two Teflon (registered trademark)-coated steel sheets with a 3 mm-thick spacer interposed therebetween, and was then cured at 80° C. for 1 hour and then at 120° C. for 12 hours to produce a cured plate having a thickness of 3 mm. The cured plate was punched into a No. 3 dumbbell-type specimen, and then the specimen was subjected to a tension test at 23° C. and at a drawing rate of 200 mm/min to measure a maximum tensile stress (MPa) and an elongation (%) at the maximum tensile stress.
[5] Measurement of Durometer Hardness of Cured Product Two of the 3 mm-thick cured plates produced in item [4] above were laminated on each other, and the durometer hardness of the resultant product was measured at 23° C. in accordance with JIS K-6253 using a type A test machine.

1. Preparation of Polymer Fine Particles

Production Example 1-1; Preparation of Core-Shell Polymer Latex (L-1)

Into a glass reactor equipped with a thermometer, a stirrer, a reflux condenser, a nitrogen flow inlet and a monomer/emulsifying agent addition device were introduced deionized water (193 parts by mass), ethylenediaminetetraacetic acid disodium salt (EDTA) (0.006 parts by mass), ferrous sulfate heptahydrate (EE) (0.0015 parts by mass), sodium formaldehydesulfoxylate (SFS) (0.6 parts by mass) and sodium dodecylbenzenesulfonate (SDS) (0.01 parts by mass). The resultant solution was heated to 60° C. while stirring in a nitrogen stream. Subsequently, a mixture of core layer monomers (methyl methacrylate (MMA) (87 parts by mass), allyl methacrylate (ALMA) (4 parts by mass) and cumene hydroperoxide (CHP) (0.13 parts by mass)) was dropwise added to the solution over 3 hours. At the same time of the addition of the monomer mixture, a 5% by mass-aqueous SDS solution (20 parts by mass) was further added continuously over 3 hours. After the completion of the addition of the monomer mixture, the stirring of the solution was continued for 1 hour to complete the polymerization, thereby producing a latex containing acrylic polymer fine particles. Subsequently, a mixture of graft monomers (MMA (2 parts by mass), butyl acrylate (BA) (8 parts by mass), 4-hydroxybutyl acrylate (4HBA) (1 part by mass) and styrene (St) (2 parts by mass)) and CHP (0.07 parts by mass) was added to the solution continuously over 120 minutes. After the completion of the addition, CHP (0.07 parts by mass) was added to the solution, and the stirring was further continued for 2 hours to complete the polymerization, thereby producing a latex (L-1) containing core-shell polymer fine particles. The polymerization conversion rate of the monomer components was 99% or more. The volume average particle diameter of the core-shell polymer fine particles contained in the latex was 0.35 µm.

Production Example 1-2; Preparation of Core-Shell Polymer Latex (L-2)

A latex (L-2) of a core-shell polymer was produced in the same manner as in Production Example 1-1, except that MMA (3 parts by mass), BA (8 parts by mass), St (2 parts by mass)> were used as graft monomers in place of <MMA (2 parts by mass), BA (8 parts by mass), 4HBA (1 part by mass), St (2 parts by mass)>. The volume average particle diameter of the core-shell polymer fine particles contained in the latex was 0.35 µm.

Production Example 1-3; Preparation of Core-Shell Polymer Latex (L-3)

A latex (L-3) of a core-shell polymer was produced in the same manner as in Production Example 1-1, except that MMA (1 part by mass), BA (8 parts by mass), 4HBA (2 parts by mass), St (2 parts by mass)> were used as graft monomers in place of <MMA (2 parts by mass), BA (8 parts by mass), 4HBA (1 part by mass), St (2 parts by mass)>. The volume average particle diameter of the core-shell polymer fine particles contained in the latex was 0.35 μm.

Production Example 1-4; Preparation of Core-Shell Polymer Latex (L-4)

Into a pressure-resistant polymerization machine were introduced deionized water (200 parts by mass), tripotassium phosphate (0.03 parts by mass), EDTA (0.002 parts by mass), FE (0.001 parts by mass) and SDS (1.55 parts by mass). The resultant mixture was purged with nitrogen sufficiently while stirring to remove oxygen, then butadiene (BD) (100 parts by mass) was introduced into the system, and then the resultant solution was heated to 45° C. Paramenthane hydroperoxide (PHP) (0.03 parts by mass) and then SFS (0.10 parts by mass) were introduced into the solution to start the polymerization. Each of 3 hours, 5 hours and 7 hours after the start of the polymerization, PHP (0.025 parts by mass) was introduced. Each of 4 hours, 6 hours and 8 hours after the start of the polymerization, EDTA (0.0006 parts by mass) and EE (0.003 parts by mass) were introduced. Fifteen hours after the start of the polymerization, remaining monomers were removed by evaporation under reduced pressure to complete the polymerization, thereby producing a polybutadiene rubber latex (R-1) containing a polybutadiene rubber as the main component. The volume average particle diameter of the polybutadiene rubber particles contained in the latex was 0.08 μm.

Subsequently, into a pressure-resistant polymerization machine were introduced the polybutadiene rubber latex (R-1) (21 parts by mass) (including a polybutadiene rubber (7 parts by mass)), deionized water (185 parts by mass), tripotassium phosphate (0.03 parts by mass), EDTA (0.002 parts by mass) and FE (0.001 parts by mass). The resultant mixture was purged with nitrogen sufficiently while stirring to remove oxygen, then BD (93 parts by mass) was introduced into the system, and then the resultant solution was heated to 45° C. PHP (0.02 parts by mass) and then SFS (0.10 parts by mass) were introduced to start the polymerization. At every three hours from the start of the polymerization to 24 hours, PHP (0.025 parts by mass), EDTA (0.0006 parts by mass) and FE (0.003 parts by mass) were introduced. Thirty hours after the start of the polymerization, remaining monomers were removed by evaporation under reduced pressure to complete the polymerization, thereby producing a polybutadiene rubber latex (R-2) containing a polybutadiene rubber as the main component. The volume average particle diameter of the polybutadiene rubber particles contained in the latex was 0.20 μm.

Into a glass reactor equipped with a thermometer, a stirrer, a reflux condenser, a nitrogen flow inlet and a monomer addition device were introduced the polybutadiene rubber latex (R-2) (261 parts by mass) (including polybutadiene rubber particles (87 parts by mass)), and deionized water (26 parts by mass). The resultant mixture was stirred at 60° C. while being purged with nitrogen. EDTA (0.004 parts by mass), FE (0.001 parts by mass) and SFS (0.2 parts by mass) were added, then a mixture of graft monomers (MMA (6 parts by mass), BA (6 parts by mass), 4HBA (1 part by mass)) and CHP (0.14 parts by mass) was added continuously over 120 minutes. After the completion of the addition, CHP (0.07 parts by mass) was added, and the stirring of the resultant solution was further continued for 2 hours to complete the polymerization, thereby producing an aqueous latex (L-4) containing a core-shell polymer. The polymerization conversion rate of the monomer components was 99% or more. The volume average particle diameter of the core-shell polymer contained in the aqueous latex was 0.21 μm.

Production Example 1-5; Preparation of Core-Shell Polymer Latex (L-5)

A latex (L-5) of a core-shell polymer was produced in the same manner as in Production Example 1-1, except that MMA (72 parts by mass), BA (15 parts by mass), ALMA (4 parts by mass)> were used as monomers for core layer in place of <MMA (87 parts by mass), ALMA (4 parts by mass)>. The volume average particle diameter of the core-shell polymer fine particles contained in the latex was 0.35 μm.

Production Example 1-6; Preparation of Core-Shell Polymer Latex (L-6)

A latex (L-6) of a core-shell polymer was produced in the same manner as in Production Example 1-1, except that MMA (57 parts by mass), BA (30 parts by mass), ALMA (4 parts by mass)> were used as monomers for core layer in place of <MMA (87 parts by mass), ALMA (4 parts by mass)>. The volume average particle diameter of the core-shell polymer fine particles contained in the latex was 0.35 μm.

Production Example 1-7; Preparation of Core-Shell Polymer Latex (L-7)

A latex (L-7) of a core-shell polymer was produced in the same manner as in Production Example 1-1, except that MMA (42 parts by mass), BA (45 parts by mass), ALMA (4 parts by mass)> were used as monomers for core layer in place of <MMA (87 parts by mass), ALMA (4 parts by mass)>. The volume average particle diameter of the core-shell polymer fine particles contained in the latex was 0.35 μm.

Production Example 1-8; Preparation of Core-Shell Polymer Latex (L-8)

A latex (L-8) of a core-shell polymer was produced in the same manner as in Production Example 1-1, except that MMA (27 parts by mass), BA (60 parts by mass), ALMA (4 parts by mass)> were used as monomers for core layer in place of <MMA (87 parts by mass), ALMA (4 parts by mass)>. The volume average particle diameter of the core-shell polymer fine particles contained in the latex was 0.35 μm.

Production Example 1-9; Preparation of Core-Shell Polymer Latex (L-9)

A latex (L-9) of a core-shell polymer was produced in the same manner as in Production Example 1-1, except that MMA (57 parts by mass), BA (30 parts by mass), ALMA (4 parts by mass)> were used as monomers for core layer in place of <MMA (87 parts by mass), ALMA (4 parts by mass)>. The volume average particle diameter of the core-shell polymer fine particles contained in the latex was 0.35 μm.

Production Example 1-10; Preparation of Core-Shell Polymer Latex (L-10)

A latex (L-10) of a core-shell polymer was produced in the same manner as in Production Example 1-1, except that SDS to be charged first was used in 0.4 parts by mass in place of 0.01 parts by mass, <MMA (52.4 parts by mass), BA (27.6 parts by mass), ALMA (4 parts by mass)> was used as monomers for core layer in place of <MMA 87 (parts by mass), ALMA (4 parts by mass)>, <MMA (3.1 parts by mass), BA (12.3 parts by mass), 4HBA (1.5 parts by mass), St (3.1 parts by mass)> was used as graft monomers in place of <MMA (2 parts by mass), BA (8 parts by mass), 4HBA (1 part by mass), St (2 parts by mass)>. The volume average particle diameter of the core-shell polymer fine particles contained in the latex was 0.10 µm.

Production Example 1-11; Preparation of Core-Shell Polymer Latex (L-11)

A latex (L-11) of a core-shell polymer was produced in the same manner as in Production Example 1-1, except that MMA (67 parts by mass), St (20 parts by mass), ALMA (4 parts by mass)> were used as monomers for core layer in place of <MMA (87 parts by mass), ALMA (4 parts by mass)>. The volume average particle diameter of the core-shell polymer fine particles contained in the latex was 0.25 µm.

Production Example 1-12; Preparation of Core-Shell Polymer Latex (L-12)

A latex (L-12) of a core-shell polymer was produced in the same manner as in Production Example 1-1, except that MMA (77 parts by mass), St (10 parts by mass), ALMA (4 parts by mass)> were used as monomers for core layer in place of <MMA (87 parts by mass), ALMA (4 parts by mass)>. The volume average particle diameter of the core-shell polymer fine particles contained in the latex was 0.27 µm.

Production Example 1-13; Preparation of Core-Shell Polymer Latex (L-13)

Into a glass reactor equipped with a thermometer, a stirrer, a reflux condenser, a nitrogen flow inlet and a monomer addition device were introduced the polybutadiene rubber latex (R-1) produced in Production Example 1-1 (246 parts by mass) (including a polybutadiene rubber particle (83 parts by mass)) and deionized water (37 parts by mass). The resultant mixture was stirred at 60° C. while being purged with nitrogen. EDTA (0.004 parts by mass), EE (0.001 parts by mass) and SFS (0.2 parts by mass) were added to the solution, and then a mixture of graft monomers (MMA (10.5 parts by mass), BA (6 parts by mass), 4HBA (0.5 parts by mass)) and CHP (0.11 parts by mass) was added to the resultant solution continuously over 120 minutes. After the completion of the addition, CHP (0.07 parts by mass) was added, the stirring of the solution was further continued for 2 hours to complete the polymerization, thereby producing an aqueous latex (L-13) containing a core-shell polymer. The polymerization conversion rate of the monomer components was 99% or more. The volume average particle diameter of the core-shell polymer contained in the aqueous latex was 0.10 µm.

2. Preparation of Dispersion in which Polymer Fine Particles (C) were Dispersed in Polyol (A)

Production Example 2-1; Preparation of Dispersion (M-1)

Methyl ethyl ketone (MEK) (132 g) was introduced into a 1-L mixing vessel at 25° C., and then the core-shell polymer latex (L-1) (132 g (corresponding to 40 g of polymer fine particles)) produced in Production Example 1-1 was introduced thereinto while stirring. The resultant solution was mixed homogeneously, and then water (200 g) was introduced into the solution at a supply rate of 80 g/min. After the completion of the supply, the stirring was terminated rapidly to produce a liquid slurry composed of an aqueous phase containing a portion of floating aggregates and a portion of an organic solvent. Subsequently, the aqueous phase (360 g) except the aggregates including a portion of the aqueous phase was discharged through an outlet located at the bottom of the vessel. MEK (150 g) was further added to the resultant aggregates, then the resultant mixture was mixed homogeneously to produce a dispersion in which the core-shell polymer was dispersed homogeneously. The dispersion was mixed with a polyol (A) (a bifunctional polyether polyol (A-1: Actcol D-2000 (manufactured by Mitsui Chemicals, Inc.), hydroxyl value: 55 mgKOH/g, a polyol (A-i))) (60 g). MEK was removed from the mixture with a rotary evaporator. In this manner, a dispersion (M-1) in which polymer fine particles were dispersed in the polyol (A) was produced.

Production Examples 2-2 to 10; Preparation of Dispersions (M-2 to 10)

Dispersions (M-2 to 10) in each of which polymer fine particles were dispersed in a polyol (A) were produced in the same manner as in Production Example 2-1, except that each of (L-2 to 10) produced in Production Examples 1-2 to 10 was used as the core-shell polymer latex in place of (L-1).

Production Example 2-11; Preparation of Dispersion (M-11)

A dispersion (M-11) in which polymer fine particles were dispersed in a polyol (A) was produced in the same manner as in Production Example 2-1, except that a trifunctional polyether polyol (A-4: SANNIX FA-703 (manufactured by Sanyo Chemical Industries, Ltd.), hydroxyl value: 33 mgKOH/g) (60 g) was mixed in place of a bifunctional polyether polyol (A-1) (60 g) as the polyol (A).

Production Examples 2-12 to 20; Preparation of Dispersions (M-12 to 20)

Dispersions (M-12 to 20) in each of which polymer fine particles were dispersed in a polyol (A) were produced in the same manner as in Production Example 2-11, except that each of (L-2, 3, 5, 6, 7, 8, 11, 12 and 13) produced in Production Examples 1-2, 3, 5, 6, 7, 8, 11, 12 and 13 was used as the core-shell polymer latex in place of (L-1).

Production Examples 2-21 to 24; Preparation of Dispersions (M-21 to 24)

Dispersions (M-21 to 24) in each of which polymer fine particles were dispersed in a polyol (A) were produced in the same manner as in Production Example 2-1, except that each of (L-5 to 8) produced in Production Examples 1-5 to 8 was used as the core-shell polymer latex in place of (L-1) and polytetramethylene ether glycol (A-5: PTMG 2000 (manufactured by Mitsubishi Chemical Corporation), hydroxyl value: 56 mgKOH/g) (120 g) was mixed in place of the bifunctional polyether polyol (A-1) having a PPG main chain (60 g) as a polyol (A).

Production Example 2-25; Preparation of Dispersion (M-25)

A dispersion (M-25) in which polymer fine particles were dispersed in a polyol (A) was produced in the same manner as in Production Example 2-1, except that a trifunctional polyether polyol (A-2: Actcol T-300 (manufactured by Mitsui Chemicals, Inc.), hydroxyl value: 530 mgKOH/g) (80 g) was mixed in place of the bifunctional polyether polyol (A-1) (60 g) as the polyol UV.

Examples 1 to 3, Comparative Examples 1 to 2

In accordance with the formulations shown in Table 1, a polyol (A) (a bifunctional polyether polyol (A-1) (a polyol (A-ii-1) or a trifunctional polyether polyol (A-2) (a polyol (A-ii-2)), polymeric MDI (B-1: COSMONATE M-200 manufactured by Mitsui Chemicals, Inc.) which was a polyisocyanate (B), each of the dispersions (M-1 to 4) produced in Production Examples 2-1 to 4, CAB-O-SIL TS-720 (fumed silica of which the surfaces were treated with polydimethylsiloxane, manufactured by CABOT), and powdery synthetic zeolite A-3 (a fraction passing through 200-mesh sieve: manufactured by Wako Pure Chemical Industries Ltd.) were weighed, and these components were fully mixed together and then defoamed to produce curable compositions. Each of the compositions was used to measure physical properties (a maximum tensile stress, an elongation at the maximum tensile stress, a Type A durometer hardness) of a cured product in accordance with the above-mentioned test methods. The test results are shown in Table 1.

In addition, with respect to each of the dispersions (M-1 to 4), the glass transition temperature (a calculated value determined in accordance with numeral formula (1)) of the core layer in the polymer fine particles (C), the content of hydroxyl groups in a shell layer in the polymer fine particles (C), and the viscosity of the dispersion at 50° C., which were obtained by the above-mentioned methods, are shown in Table 1.

TABLE 1

| | | | | Example | | | Comparative Example | |
|---|---|---|---|---|---|---|---|---|
| | | Composition (part by mass) | | 1 | 2 | 3 | 1 | 2 |
| Polyol (A) | A-1 | Polyol (A-ii-1) | Polyether polyol; bifunctional; hydroxyl value 55 mgKOH/g | 39.2 | 39.2 | 39.2 | 69.2 | 39.2 |
| | A-2 | Polyol (A-ii-2) | Polyether polyol; trifunctional; hydroxyl value 530 mgKOH/g | 7.3 | 7.3 | 7.3 | 7.3 | 7.3 |
| Polyisocyanate (B) | B-1 | | Polymeric MDI | 18.5 | 18.5 | 18.5 | 18.5 | 18.5 |
| Dispersion (M) in which polymer fine particles (C) are dispersed in polyol (A-1) (polyol (A-i)) | M-1 | Core layer | MMA/ALMA = 87/4 | 50 | | | | |
| | | Shell layer | MMA/BA/4HBA/ST = 2/8/1/2 | | | | | |
| | | Tg of core layer | 105° C. (*) | | | | | |
| | | Hydroxyl group content in shell layer | 0.53 (**) | | | | | |
| | | Viscosity | 2 (***) | | | | | |
| | | Volume average particle diameter | 0.35 μm | | | | | |
| | M-2 | Core layer | MMA/ALMA = 87/4 | | 50 | | | |
| | | Shell layer | MMA/BA/ST = 3/8/2 | | | | | |
| | | Tg of core layer | 105° C. (*) | | | | | |
| | | Hydroxyl group content in shell layer | 0 (**) | | | | | |
| | | Viscosity | 22 (***) | | | | | |
| | | Volume average particle diameter | 0.35 μm | | | | | |
| <Content of polymer fine particles (C) in each dispersion (M) is 40% by mass> | M-3 | Core layer | MMA/ALMA = 87/4 | | | 50 | | |
| | | Shell layer | MMA/BA/4HBA/ST = 1/8/2/2 | | | | | |
| | | Tg of core layer | 105° C. (*) | | | | | |
| | | Hydroxyl group content in shell layer | 1.07 (**) | | | | | |
| | | Viscosity | 7 (***) | | | | | |
| | | Volume average particle diameter | 0.35 μm | | | | | |
| | M-4 | Core layer | BD | | | | | 50 |
| | | Shell layer | MMA/BA/4HBA = 6/6/1 | | | | | |
| | | Tg of core layer | −40° C. or lower (*) | | | | | |
| | | Hydroxyl group content in shell layer | 0.69 (**) | | | | | |
| | | Viscosity | 10 (***) | | | | | |
| | | Volume average particle diameter | 0.21 μm | | | | | |
| Fumed silica | | TS-720 | | 0.5 | 0.5 | 0.5 | 0.5 | 0.5 |
| Dehydrating agent | | Synthetic zeolite | | 5 | 5 | 5 | 5 | 5 |
| Amount of polyisocyanate (B) relative to 100 parts of polyol (A) (part by mass) | | | | 24 parts | 24 parts | 24 parts | 24 parts | 24 parts |
| Amount of polymer fine particles (C) relative to 100 parts of total amount of polyol (A) and polyisocyanate (B) (part by mass) | | | | 21 parts | 21 parts | 21 parts | — | 21 parts |

TABLE 1-continued

|  | | Example | | | Comparative Example | |
|---|---|---|---|---|---|---|
| Composition (part by mass) | | 1 | 2 | 3 | 1 | 2 |
| | Average hydroxyl value of polyol (A) (mgKOH/g) | 100 | 100 | 100 | 100 | 100 |
| Physical properties of cured product | Maximum tensile stress (MPa) | 4.1 | 3.8 | 3.9 | 1.1 | 2.6 |
| | Elongation at maximum tensile stress (%) | 74 | 76 | 80 | 47 | 93 |
| | Durometer hardness <type A> of cured product | 71 | 72 | 69 | 59 | 62 |

(*) Glass transition temperature of core layer in polymer fine particles (C) as calculated in accordance with numerical formula (1)
(**) Content of hydroxyl groups in shell layer in polymer fine particles (C), (mmol/g)
(***) Viscosity of dispersion at 50° C. (Pa · s)

From results of Table 1, the curable compositions according to the present invention have such properties that cured products formed therefrom had high strength (maximum tensile stresses) and high elongations.

Examples 4 to 8, Comparative Examples 3 to 4

In accordance with the formulations shown in Table 2, a polyol (A) (a bifunctional polyether polyol (A-1) (a polyol polymeric MDI (B-1) which was a polyisocyanate (B), each of the dispersions (M-1 and 4 to 8) produced in Production Examples 2-1 and 4 to 8, CAB-O-SIL TS-720, and powdery synthetic zeolite A-3 were weighed, and these components were fully mixed together and then defoamed to produce curable compositions. Each of the compositions was used to measure physical properties (a maximum tensile stress, an elongation at the maximum tensile stress, a Type A durometer hardness) of a cured product in accordance with the above-mentioned test methods. The test results are shown in Table 2.

In addition, with respect to each of the dispersions (M-1, 4 to 8), the glass transition temperature (a calculated value determined in accordance with numeral formula (1)) of a core layer in the polymer fine particles (C), the content of hydroxyl groups in a shell layer in the polymer fine particles (C), and the viscosity of the dispersion at 25° C., which were obtained by the above-mentioned methods, are shown in Table 2.

TABLE 2

| | | | | Example | | | | | Comparative Example | |
|---|---|---|---|---|---|---|---|---|---|---|
| Composition (part by mass) | | | | 4 | 5 | 6 | 7 | 8 | 3 | 4 |
| Polyol (A) | A-1 | Polyol (A-ii) | Polyether polyol; bifunctional; hydroxyl value 55 mgKOH/g | 58.2 | 58.2 | 58.2 | 58.2 | 28.2 | 58.2 | 58.2 |
| Polyisocyanate (B) | B-1 | | Polymeric MDI | 11.8 | 11.8 | 11.8 | 11.8 | 11.8 | 11.8 | 11.8 |
| Dispersion (M) in which polymer fine particles (C) are dispersed in polyol (A-1) (polyol (A-i)) | M-1 | Core layer | MMA/ALMA = 87/4 | 50 | | | | | | |
| | | Shell layer | MMA/BA/4HBA/ST = 2/8/1/2 | | | | | | | |
| | | Tg of core layer | 105° C. (*) | | | | | | | |
| | | Hydroxyl group content in shell layer | 0.53 (**) | | | | | | | |
| | | Viscosity | 22 (***) | | | | | | | |
| | | Volume average particle diameter | 0.35 μm | | | | | | | |
| | M-5 | Core layer | MMA/BA/ALMA = 72/15/4 | | 50 | | | | | |
| | | Shell layer | MMA/BA/4HBA/ST = 2/8/1/2 | | | | | | | |
| | | Tg of core layer | 63° C. (*) | | | | | | | |
| | | Hydroxyl group content in shell layer | 0.53 (**) | | | | | | | |
| | | Viscosity | 9 (***) | | | | | | | |
| | | Volume average particle diameter | 0.35 μm | | | | | | | |
| | M-6 | Core layer | MMA/BA/ALMA = 57/30/4 | | | 50 | | | 100 | |
| | | Shell layer | MMA/BA/4HBA/ST = 2/8/1/2 | | | | | | | |
| | | Tg of core layer | 29° C. (*) | | | | | | | |
| | | Hydroxyl group content in shell layer | 0.53 (**) | | | | | | | |
| | | Viscosity | 2 (***) | | | | | | | |
| | | Volume average particle diameter | 0.35 μm | | | | | | | |
| <Content of polymer fine particles (C) in each dispersion (M) is 40% by mass> | M-7 | Core layer | MMA/BA/ALMA = 42/45/4 | | | | 50 | | | |
| | | Shell layer | MMA/BA/4HBA/ST = 2/8/1/2 | | | | | | | |
| | | Tg of core layer | 1° C. (*) | | | | | | | |
| | | Hydroxyl group content in shell layer | 0.53 (**) | | | | | | | |
| | | Viscosity | 2 (***) | | | | | | | |
| | | Volume average particle diameter | 0.35 μm | | | | | | | |

TABLE 2-continued

| Composition (part by mass) | | | Example 4 | Example 5 | Example 6 | Example 7 | Example 8 | Comparative Example 3 | Comparative Example 4 |
|---|---|---|---|---|---|---|---|---|---|
| M-8 | Core layer | MMA/BA/ALMA = 27/60/4 | | | | | | 50 | |
| | Shell layer | MMA/BA/4HBA/ST = 2/8/1/2 | | | | | | | |
| | Tg of core layer | −22° C. (*) | | | | | | | |
| | Hydroxyl group content in shell layer | 0.53 (**) | | | | | | | |
| | Viscosity | 3 (***) | | | | | | | |
| | Volume average particle diameter | 0.35 µm | | | | | | | |
| M-4 | Core layer | BD | | | | | | | 50 |
| | Shell layer | MMA/BA/4HBA = 6/6/1 | | | | | | | |
| | Tg of core layer | −40° C. or lower (*) | | | | | | | |
| | Hydroxyl group content in shell layer | 0.69 (**) | | | | | | | |
| | Viscosity | 40 or higher (***) | | | | | | | |
| | Volume average particle diameter | 0.21 µm | | | | | | | |
| Fumed silica | | TS-720 | 0.5 | 0.5 | 0.5 | 0.5 | 0.5 | 0.5 | 0.5 |
| Dehydrating agent | | Synthetic zeolite | 5 | 5 | 5 | 5 | 5 | 5 | 5 |
| Amount of polyisocyanate (B) relative to 100 parts of polyol (A) (part by mass) | | | 13 parts | 13 parts | 13 parts | 13 parts | 13 parts | 13 parts | 13 parts |
| Amount of polymer fine particles (C) relative to 100 parts of total amount of polyol (A) and polyisocyanate (B) (part by mass) | | | 20 parts | 20 parts | 20 parts | 20 parts | 40 parts | 20 parts | 20 parts |
| Average hydroxyl value of polyol (A) (mgKOH/g) | | | 55 | 55 | 55 | 55 | 55 | 55 | 55 |
| Physical properties of cured product | Maximum tensile stress (MPa) | | 2.7 | 3.0 | 2.1 | 1.9 | 3.8 | 1.6 | 1.2 |
| | Elongation at maximum tensile stress (%) | | 161 | 160 | 163 | 154 | 142 | 151 | 137 |
| | Durometer hardness <type A> of cured product | | 49 | 44 | 44 | 40 | 50 | 40 | 47 |

(*) Glass transition temperature of core layer in polymer fine particles (C) as calculated in accordance with numerical formula (1)
(**) Content of hydroxyl groups in shell layer in polymer fine particles (C), (mmol/g)
(***) Viscosity of dispersion at 25° C. (Pa · s)

From results of Table 2, the curable compositions according to the present invention have such properties that cured products formed therefrom had high strength (maximum tensile stresses), high elongations and moderate durometer hardness.

Examples 9 to 15, Comparative Examples 5 to 9

In accordance with the formulations shown in Table 3, a polyol (A) (a bifunctional polyether polyol (A-1) (a polyol (A-ii-1)), a trifunctional polyether polyol (A-2) (a polyol (A-ii-2-1)) or 1,4-butane diol (A-3: manufactured by Wako Pure Chemical Industries Ltd., hydroxyl value: 1245 mgKOH/g, a polyol (A-ii-2-2)), monomeric MDI (B-2: manufactured by Wako Pure Chemical Industries Ltd.) which was a polyisocyanate (B), each of the dispersions (M-4 to 10) produced in Production Examples 2-4 to 10, CAB-O-SIL TS-720 and powdery synthetic zeolite A-3 were weighed, and these components were fully mixed together and then defoamed to produce curable compositions. Each of the compositions was used to measure physical properties (a maximum tensile stress, an elongation at the maximum tensile stress, a Type A durometer hardness) of a cured product in accordance with the above-mentioned test methods. The test results are shown in Table 3.

In addition, with respect to each of the dispersions (M-4 to 10), the glass transition temperature (a calculated value determined in accordance with numeral formula (1)) of a core layer in the polymer fine particles (C), the content of hydroxyl groups in a shell layer in the polymer fine particles (C), and the viscosity of the dispersion at 25° C., which were obtained by the above-mentioned methods, are shown in Table 3.

TABLE 3

| | Composition (part by mass) | | | Example | | | | | | | | Comparative Example | | | | |
|---|---|---|---|---|---|---|---|---|---|---|---|---|---|---|---|---|
| | | | | 9 | 10 | 11 | 12 | 13 | 14 | 15 | 5 | 6 | 7 | 8 | 9 |
| Polyol (A) | A-1 | | Polyether polyol; bifunctional; hydroxyl value 55 mgKOH/g | 62.5 | 62.5 | 62.5 | 62.5 | 25 | 62.5 | 62.5 | 100 | 62.5 | 100 | 62.5 | 62.5 |
| | A-2 | | Polyether polyol; trifunctional; hydroxyl value 530 mgKOH/g | 5.3 | 5.3 | 5.3 | 5.3 | 5.3 | 5.3 | 5.3 | 5.3 | 5.3 | | 5.3 | 5.3 |
| | A-3 | | 1,4-Butandiol; bifunctional; hydroxyl value 1245 mgKOH/g | 2.5 | 2.5 | 2.5 | 20.6 | 20.6 | 20.6 | 20.6 | 20.6 | 20.6 | 27.5 | 2.5 | 27.5 |
| Polyisocyanate (B) | | | Monomeric MDI | 27.5 | 27.5 | 27.5 | | | | | | | | 27.5 | |
| Dispersion (M) in which polymer fine particles (C) are dispersed in polyol (A-1) (polyol (A-i)) | M-5 | Core layer | MMA/BA/ALMA = 72/15/4 | 62.5 | | | | | | | | | | | |
| | | Shell layer | MMA/BA/4HBA/ST = 2/8/1/2 | | | | | | | | | | | | |
| | | Tg of core layer | | 63° C. (*) | | | | | | | | | | | |
| | | Hydroxyl group content in shell layer | | 0.53 (**) | | | | | | | | | | | |
| | | Viscosity | | 9 (***) | | | | | | | | | | | |
| | | Volume average particle diameter | | 0.35 μm | | | | | | | | | | | |
| | M-6 | Core layer | MMA/BA/ALMA = 57/30/4 | | 62.5 | | | | | | | | | | |
| | | Shell layer | MMA/BA/4HBA/ST = 2/8/1/2 | | | | | | | | | | | | |
| | | Tg of core layer | | | 29° C. (*) | | | | | | | | | | |
| | | Hydroxyl group content in shell layer | | | 0.53 (**) | | | | | | | | | | |
| | | Viscosity | | | 2 (***) | | | | | | | | | | |
| | | Volume average particle diameter | | | 0.35 μm | | | | | | | | | | |
| | M-7 | Core layer | MMA/BA/ALMA = 42/45/4 | | | 62.5 | | | | | | | | | |
| | | Shell layer | MMA/BA/4HBA/ST = 2/8/1/2 | | | | | | | | | | | | |
| | | Tg of core layer | | | | 1° C. (*) | | | | | | | | | |
| | | Hydroxyl group content in shell layer | | | | 0.53 (**) | | | | | | | | | |
| | | Viscosity | | | | 2 (***) | | | | | | | | | |
| | | Volume average particle diameter | | | | 0.35 μm | | | | | | | | | |
| | M-9 | Core layer | MMA/BMA/ALMA = 57/30/4 | | | | 62.5 | 125 | 62.5 | | | | | | |
| | | Shell layer | MMA/BA/4HBA/ST = 2/8/1/2 | | | | | | | | | | | | |
| | | Tg of core layer | | | | | 71° C. (*) | | | | | | | | |
| | | Hydroxyl group content in shell layer | | | | | 0.53 (**) | | | | | | | | |
| | | Viscosity | | | | | 4 (***) | | | | | | | | |
| | | Volume average particle diameter | | | | | 0.35 μm | | | | | | | | |
| | M-10 | Core layer | MMA/BA/ALMA = 52.4/27.6/4 | | | | | | | 62.5 | | | | | |
| | | Shell layer | MMA/BA/4HBA/ST = 3.1/12.3/1.5/3.1 | | | | | | | | | | | | |
| | | Tg of core layer | | | | | | | | 29° C. (*) | | | | | |
| | | Hydroxyl group content in shell layer | | | | | | | | 0.52 (**) | | | | | |
| | | Viscosity | | | | | | | | 13 (***) | | | | | |
| | | Volume average particle diameter | | | | | | | | 0.10 μm | | | | | |

<Content of polymer fine particles (C) in each dispersion (M) is 40% by mass>

TABLE 3-continued

| Composition (part by mass) | | | Example | | | | | | | Comparative Example | | | | |
|---|---|---|---|---|---|---|---|---|---|---|---|---|---|---|
| | | | 9 | 10 | 11 | 12 | 13 | 14 | 15 | 5 | 6 | 7 | 8 | 9 |
| M-8 | Core layer | MMA/BA/ALMA = 27/60/4 | | | | | | | | | | | 62.5 | |
| | Shell layer | MMA/BA/4HBA/ST = 2/8/1/2 | | | | | | | | | | | | |
| | Tg of core layer | −22° C. (*) | | | | | | | | | | | | |
| | Hydroxyl group content in shell layer | 0.53 (**) | | | | | | | | | | | | |
| | Viscosity | 3 (***) | | | | | | | | | | | | |
| | Volume average particle diameter | 0.35 μm | | | | | | | | | | | | |
| M-4 | Core layer | BD | | | | | | | | | 62.5 | | | 62.5 |
| | Shell layer | MMA/BA/4HBA = 6/6/1 | | | | | | | | | | | | |
| | Tg of core layer | −40° C. or lower (*) | | | | | | | | | | | | |
| | Hydroxyl group content in shell layer | 0.69 (**) | | | | | | | | | | | | |
| | Viscosity | 40 or higher (***) | | | | | | | | | | | | |
| | Volume average particle diameter | 0.21 μm | | | | | | | | | | | | |
| Fumed silica | TS-720 | | 0.5 | 0.5 | 0.5 | 0.5 | 0.5 | 0.5 | 0.5 | 0.5 | 0.5 | 0.5 | 0.5 | 0.5 |
| Dehydrating agent | Synthetic zeolite | | 5 | 5 | 5 | 5 | 5 | 5 | 5 | 5 | 5 | 5 | 5 | 5 |
| Amount of polyisocyanate (B) relative to 100 parts of polyol (A) (part by mass) | | | 26 parts | 26 parts | 26 parts | 20 parts | 20 parts | 20 parts | 20 parts | 20 parts | 20 parts | 26 parts | 26 parts | 26 parts |
| Amount of polymer fine particles (C) relative to 100 parts of total amount of polyol (A) and polyisocyanate (B) (part by mass) | | | 18 parts | 18 parts | 18 parts | 20 parts | 20 parts | 20 parts | 20 parts | — | 20 parts | — | 18 parts | 18 parts |
| Average hydroxyl value of polyol (A) (mgKOH/g) | | | 106 | 106 | 106 | 79 | 79 | 79 | 79 | 79 | 79 | 106 | 106 | 106 |
| Physical properties of cured product | Maximum tensile stress (MPa) | | 7.5 | 7.1 | 7.0 | 5.5 | 9.3 | 6.7 | 5.9 | 2.1 | 2.2 | 2.1 | 5.2 | 2.8 |
| | Elongation at maximum tensile stress (%) | | 260 | 236 | 256 | 244 | 201 | 249 | 245 | 194 | 199 | 206 | 227 | 203 |
| | Durometer hardness <type A> of cured product | | 60 | 57 | 57 | 51 | 61 | 54 | 50 | 49 | 44 | 43 | 52 | 45 |

(*) Glass transition temperature of core laye in polymer fine particles (C) as calculated in accordance with numerical formula (1)
(**) Content of hydroxyl groups in shell layer in polymer fine particles (C), (mmol/g)
(***) Viscosity of dispersion at 25° C. (Pa · s)

From results of Table 3, the curable compositions according to the present invention have such properties that cured products formed therefrom had high strength (maximum tensile stresses), high elongations and moderate durometer hardness.

Examples 16 to 24, Comparative Examples 10 to 12

In accordance with the formulations shown in Table 4, a polyol (A) (a trifunctional polyether polyol (A-4), a polyol (A-ii)), monomeric MDI (B-2) which was a polyisocyanate (B), each of the dispersions (M-11 to 20) produced in Production Examples 2-11 to 20, CAB-O-SIL TS-720 and powdery synthetic zeolite A-3 were weighed, and these components were fully mixed together and then defoamed to produce curable compositions. Each of the compositions was used to measure physical properties (a maximum tensile stress, an elongation at the maximum tensile stress, a Type A durometer hardness) of a cured product in accordance with the above-mentioned test methods. The test results are shown in Table 4.

In addition, with respect to each of the dispersions (M-11 to 20), the glass transition temperature (a calculated value determined in accordance with numeral formula (1)) of a core layer in the polymer fine particles (C), the content of hydroxyl groups in a shell layer in the polymer fine particles (C), and the viscosity of the dispersion at 25° C., which were obtained by the above-mentioned methods, are shown in Table 4.

TABLE 4

| | | | | | Example | | | | | | | | | Comparative Example | | |
|---|---|---|---|---|---|---|---|---|---|---|---|---|---|---|---|---|
| | | Composition (part by mass) | | | 16 | 17 | 18 | 19 | 20 | 21 | 22 | 23 | 24 | 10 | 11 | 12 |
| Polyol (A) | A-1 | | Polyether polyol; trifunctional; hydroxyl value 33 mgKOH/g | | 70 | 70 | 70 | 70 | 70 | 70 | 40 | 70 | 70 | 100 | 70 | 70 |
| Polyisocyanate (B) | | B-2 | Monomeric MDI | | 8.1 | 8.1 | 8.1 | 8.1 | 8.1 | 8.1 | 8.1 | 8.1 | 8.1 | 8.1 | 8.1 | 8.1 |
| Dispersion (M) in which polymer fine particles (C) are dispersed in polyol (A-4) (polyol (A-i)) | | M-11 | Core layer | MMA/ST/ALMA = 67/20/4 | 50 | | | | | | | | | | | |
| | | | Shell layer | MMA/BA/4HBA/ST = 2/8/1/2 | | | | | | | | | | | | |
| | | | Tg of core layer | 105° C. (*) | | | | | | | | | | | | |
| | | | Hydroxyl group content in shell layer | 0.53 (**) | | | | | | | | | | | | |
| | | | Viscosity | 20 (***) | | | | | | | | | | | | |
| | | | Volume average particle diameter | 0.25 μm | | | | | | | | | | | | |
| | | M-12 | Core layer | MMA/ALMA = 87/4 | | 50 | | | | | | | | | | |
| | | | Shell layer | MMA/BA/ST = 3/8/2 | | | | | | | | | | | | |
| | | | Tg of core layer | 105° C. (*) | | | | | | | | | | | | |
| | | | Hydroxyl group content in shell layer | 0 (**) | | | | | | | | | | | | |
| | | | Viscosity | 40 or higher (***) | | | | | | | | | | | | |
| | | | Volume average particle diameter | 0.35 μm | | | | | | | | | | | | |
| | | M-13 | Core layer | MMA/ALMA = 87/4 | | | 50 | | | | | | | | | |
| | | | Shell layer | MMA/BA/4HBA/ST = 1/8/2/2 | | | | | | | | | | | | |
| | | | Tg of core layer | 105° C. (*) | | | | | | | | | | | | |
| | | | Hydroxyl group content in shell layer | 1.07 (**) | | | | | | | | | | | | |
| | | | Viscosity | 11 (***) | | | | | | | | | | | | |
| | | | Volume average particle diameter | 0.35 μm | | | | | | | | | | | | |
| | | M-14 | Core layer | MMA/BA/ALMA = 72/15/4 | | | | 50 | | | 100 | | | | | |
| | | | Shell layer | MMA/BA/4HBA/ST = 2/8/1/2 | | | | | | | | | | | | |
| | | | Tg of core layer | 63° C. (*) | | | | | | | | | | | | |
| | | | Hydroxyl group content in shell layer | 0.53 (**) | | | | | | | | | | | | |
| | | | Viscosity | 8 (***) | | | | | | | | | | | | |
| | | | Volume average particle diameter | 0.35 μm | | | | | | | | | | | | |
| <Content of polymer fine particles (C) in each dispersion (M) is 40% by mass> | | | | | | | | | | | | | | | | |

TABLE 4-continued

| | Composition (part by mass) | | 16 | 17 | 18 | 19 | 20 | 21 | 22 | 23 | 24 | 10 | 11 | 12 |
|---|---|---|---|---|---|---|---|---|---|---|---|---|---|---|
| M-15 | Core layer | MMA/BA/ALMA = 57/30/4 | | | | | 50 | | | | | | | |
| | Shell layer | MMA/BA/4HBA/ST = 2/8/1/2 | | | | | | | | | | | | |
| | Tg of core layer | 29° C. (*) | | | | | | | | | | | | |
| | Hydroxyl group content in shell layer | 0.53 (**) | | | | | | | | | | | | |
| | Viscosity | 6 (***) | | | | | | | | | | | | |
| | Volume average particle diameter | 0.35 μm | | | | | | | | | | | | |
| M-16 | Core layer | MMA/BA/ALMA = 42/45/4 | | | | | | 50 | | | | | | |
| | Shell layer | MMA/BA/4HBA/ST = 2/8/1/2 | | | | | | | | | | | | |
| | Tg of core layer | 1° C. (*) | | | | | | | | | | | | |
| | Hydroxyl group content in shell layer | 0.53 (**) | | | | | | | | | | | | |
| | Viscosity | 6 (***) | | | | | | | | | | | | |
| | Volume average particle diameter | 0.35 μm | | | | | | | | | | | | |
| M-18 | Core layer | MMA/ST/ALMA = 67/20/4 | | | | | | | | 50 | | | | |
| | Shell layer | MMA/BA/4HBA/ST = 2/8/1/2 | | | | | | | | | | | | |
| | Tg of core layer | 104° C. (*) | | | | | | | | | | | | |
| | Hydroxyl group content in shell layer | 1.07 (**) | | | | | | | | | | | | |
| | Viscosity | 9 (***) | | | | | | | | | | | | |
| | Volume average particle diameter | 0.25 μm | | | | | | | | | | | | |
| M-19 | Core layer | MMA/ST/ALMA = 77/10/4 | | | | | | | | | 50 | | | |
| | Shell layer | MMA/BA/4HBA/ST = 2/8/1/2 | | | | | | | | | | | | |
| | Tg of core layer | 104° C. (*) | | | | | | | | | | | | |
| | Hydroxyl group content in shell layer | 1.07 (**) | | | | | | | | | | | | |
| | Viscosity | 9 (***) | | | | | | | | | | | | |
| | Volume average particle diameter | 0.27 μm | | | | | | | | | | | | |

TABLE 4-continued

| Composition (part by mass) | | | 16 | 17 | 18 | 19 | Example 20 | 21 | 22 | 23 | 24 | 10 | Comparative Example 11 | 12 |
|---|---|---|---|---|---|---|---|---|---|---|---|---|---|---|
| M-17 | Core layer | MMA/BA/ALMA = 27/60/4 | | | | | | | | | | | 50 | |
| | Shell layer | MMA/BA/4HBA/ST = 2/8/1/2 | | | | | | | | | | | | |
| | Tg of core layer | −22° C. (*) | | | | | | | | | | | | |
| | Hydroxyl group content in shell layer | 0.53 (**) | | | | | | | | | | | | |
| | Viscosity | 7 (***) | | | | | | | | | | | | |
| | Volume average particle diameter | 0.35 μm | | | | | | | | | | | | |
| M-20 | Core layer | BD | | | | | | | | | | | | 50 |
| | Shell layer | MMA/BA/4HBA = 6/6/1 | | | | | | | | | | | | |
| | Tg of core layer | −40° C. or lower (*) | | | | | | | | | | | | |
| | Hydroxyl group content in shell layer | 0.20 (**) | | | | | | | | | | | | |
| | Viscosity | 42 (***) | | | | | | | | | | | | |
| | Volume average particle diameter | 0.10 μm | | | | | | | | | | | | |
| Fumed silica | TS-720 | | 0.5 | 0.5 | 0.5 | 0.5 | 0.5 | 0.5 | 0.5 | 0.5 | 0.5 | 0.5 | 0.5 | 0.5 |
| Dehydrating agent | Synthetic zeolite | | 5 | 5 | 5 | 5 | 5 | 5 | 5 | 5 | 5 | 5 | 5 | 5 |
| Amount of polyisocyanate (B) relative to 100 parts of polyol (A) (part by mass) | | | 8 parts | 8 parts | 8 parts | 8 parts | 8 parts | 8 parts | 8 parts | 8 parts | 8 parts | 8 parts | 8 parts | 8 parts |
| Amount of polymer fine particles (C) relative to 100 parts of total amount of polyol (A) and polyisocyanate (B) (part by mass) | | | 19 parts | 19 parts | 19 parts | 19 parts | 19 parts | 19 parts | 37 parts | 19 parts | 19 parts | — | 19 parts | 19 parts |
| Average hydroxyl value of polyol (A) (mgKOH/g) | | | 33 | 33 | 33 | 33 | 33 | 33 | 33 | 33 | 33 | 33 | 33 | 33 |
| Content of hydroxyl groups in shell layer in polymer fine particles (C), (mmol/g) | | | 3.6 | 2.9 | 3.0 | 3.2 | 2.4 | 2.3 | 6.7 | 3.2 | 3.1 | 1.1 | 2.1 | 1.4 |
| Physical properties of cured product | Maximum tensile stress (MPa) | | 287 | 308 | 275 | 259 | 215 | 219 | 248 | 299 | 289 | 154 | 228 | 171 |
| | Elongation at maximum tensile stress (%) | | 42 | 42 | 43 | 46 | 45 | 45 | 54 | 39 | 39 | 37 | 42 | 40 |
| | Durometer hardness <type A> of cured product | | | | | | | | | | | | | |

(*) Glass transition temperature of core layer in polymer fine particles (C) as calculated in accordance with numerical formula (1)
(**) Content of hydroxyl groups in shell layer in polymer fine particles (C), (mmol/g)
(***) Viscosity of dispersion at 25° C. (Pa·s)

From results of Table 4, the curable compositions according to the present invention have such properties that cured products formed therefrom had high strength (maximum tensile stresses), high elongations and moderate durometer hardness.

Examples 25 to 27, Comparative Examples 13 to 14

In accordance with the formulations shown in Table 5, a polyol (A) (polytetramethylene ether glycol (A-5) (a polyol (A-ii-1), a trifunctional polyether polyol (A-2) (a polyol (A-ii-2-1), or 1,4-butanediol (A-3) (a polyol (A-ii-2-2)), monomeric MDI (B-2) which was a polyisocyanate (B), each of the dispersions (M-21 to 24) produced in Production Example 2-21 to 24, CAB-O-SIL TS-720 and powdery synthetic zeolite A-3 were weighed, and these components were fully mixed together and then defoamed to produce curable compositions. Each of the compositions was used to measure physical properties (a maximum tensile stress, an elongation at the maximum tensile stress, a Type A durometer hardness) of a cured product in accordance with the above-mentioned test methods. The test results are shown in Table 5.

In addition, with respect to each of the dispersions (M-21 to 24), the glass transition temperature (a calculated value determined in accordance with numeral formula (1)) of a core layer in the polymer fine particles (C), the content of hydroxyl groups in a shell layer in the polymer fine particles (C), and the viscosity of the dispersion at 50° C., which were obtained by the above-mentioned methods, are shown in Table 5.

TABLE 5

| | | | | Example | | | Comparative Example | |
|---|---|---|---|---|---|---|---|---|
| Composition (part by mass) | | | | 25 | 26 | 27 | 13 | 14 |
| Polyol (A) | A-5 | Polyol (A-ii-1) | Polytetramethylene ether glycol; bifunctional; hydroxyl value 56 mgKOH/g | 25 | 25 | 25 | 100 | 25 |
| | A-2 | Polyol (A-ii-2-1) | Polyether polyol; trifunctional; hydroxyl value 530 mgKOH/g | 5.3 | 5.3 | 5.3 | 5.3 | 5.3 |
| | A-3 | Polyol (A-ii-2-2) | 1,4-Butandiol; bifunctional; hydroxyl value 1245 mgKOH/g | 2.5 | 2.5 | 2.5 | 2.5 | 2.5 |
| Polyisocyanate (B) | B-2 | | Monomeric MDI | 27.5 | 27.5 | 27.5 | 27.5 | 27.5 |
| Dispersion (M) in which polymer fine particles (C) are dispersed in polyol (A-5) (polyol (A-1)) | M-21 | Core layer | MMA/BA/ALMA = 72/15/4 | 100 | | | | |
| | | Shell layer | MMA/BA/4HBA/ST = 2/8/1/2 | | | | | |
| | | Tg of core layer | 63° C. (*) | | | | | |
| | | Hydroxyl group content in shell layer | 0.53 (**) | | | | | |
| | | Viscosity | 9 (***) | | | | | |
| | | Volume average particle diameter | 0.35 μm | | | | | |
| | M-22 | Core layer | MMA/BA/ALMA = 57/30/4 | | 100 | | | |
| | | Shell layer | MMA/BA/4HBA/ST = 2/8/1/2 | | | | | |
| | | Tg of core layer | 29° C. (*) | | | | | |
| | | Hydroxyl group content in shell layer | 0.53 (**) | | | | | |
| | | Viscosity | 2 (***) | | | | | |
| | | Volume average particle diameter | 0.35 μm | | | | | |
| <Content of polymer fine particles (C) in each dispersion (M) is 25% by mass> | M-23 | Core layer | MMA/BA/ALMA = 42/45/4 | | | 100 | | |
| | | Shell layer | MMA/BA/4HBA/ST = 2/8/1/2 | | | | | |
| | | Tg of core layer | 1° C. (*) | | | | | |
| | | Hydroxyl group content in shell layer | 0.53 (**) | | | | | |
| | | Viscosity | 2 (***) | | | | | |
| | | Volume average particle diameter | 0.35 μm | | | | | |
| | M-24 | Core layer | MMA/BA/ALMA = 27/60/4 | | | | | 100 |
| | | Shell layer | MMA/BA/4HBA/ST = 2/8/1/2 | | | | | |
| | | Tg of core layer | −22° C. (*) | | | | | |
| | | Hydroxyl group content in shell layer | 0.53 (**) | | | | | |
| | | Viscosity | 3 (***) | | | | | |
| | | Volume average particle diameter | 0.35 μm | | | | | |
| Fumed silica | | | TS-720 | 0.5 | 0.5 | 0.5 | 0.5 | 0.5 |
| Dehydrating agent | | | Synthetic zeolite | 5 | 5 | 5 | 5 | 5 |
| Amount of polyisocyanate (B) relative to 100 parts of polyol (A) (part by mass) | | | | 26 parts | 26 parts | 26 parts | 26 parts | 26 parts |
| Amount of polymer fine particles (C) relative to 100 parts of total amount of polyol (A) and polyisocyaante (B) (part by mass) | | | | 18 parts | 18 parts | 18 parts | — | 18 parts |
| Average hydroxyl value of polyol (A) (mgKOH/g) | | | | 107 | 107 | 107 | 107 | 107 |
| Physical properties of cured product | | | Maximum tensile stress (MPa) | 11.8 | 11.1 | 10.9 | 6.4 | 9.9 |
| | | | Elongation at maximum tensile stress (%) | 211 | 225 | 234 | 280 | 242 |
| | | | Durometer hardness <type A> of cured product | 79 | 78 | 75 | 67 | 70 |

(*) Glass transition temperature of core layer in polymer fine particles (C) as calculated in accordance with numerical formula (1)
(**) Content of hydroxyl groups in shell layer in polymer fine particles (C), (mmol/g)
(***) Viscosity of dispersion at 50° C. (Pa · s)

From results of Table 5, the curable compositions according to the present invention have such properties that cured products formed therefrom had high strength (maximum tensile stresses), high elongations and moderate durometer hardness.

Example 28, Comparative Examples 15 to 17

In accordance with the formulations shown in Table 6, a polyol (A) (a bifunctional polyether polyol (A-1) (a polyol (A-ii-1) or a trifunctional polyether polyol (A-2) (a polyol (A-ii-2)), polymeric MDI (B-1) which was a polyisocyanate (B), each of the dispersions (M-1, M-25) produced in Production Examples 2-1 and 2-25, CAB-O-SIL TS-720 and powdery synthetic zeolite A-3 were weighed, and these components were fully mixed together and then defoamed to produce curable compositions. Each of the compositions was used to measure physical properties (a maximum tensile stress, an elongation at the maximum tensile stress, a Type A durometer hardness) of a cured product in accordance with the above-mentioned test methods. The test results are shown in Table 6.

Cured products produced in Comparative Examples 16 to 17 shown in Table 6 had high elastic moduli and low elongations. For this reason, the tensile properties of all of the cured products shown in Table 7 were determined by a tension test in which each of the cured products was punched into a No. 1 dumbbell-type specimen in accordance with JIS K-7113 and the specimen was subjected to a tension test at 23° C. and at a drawing rate of 10 mm/min.

In addition, with respect to each of the dispersions (M-1, M-25), the glass transition temperature (a calculated value determined in accordance with numeral formula (1)) of a core layer in the polymer fine particles (C), the content of hydroxyl groups in a shell layer in the polymer fine particles (C), and the viscosity of the dispersion at 50° C., which were obtained by the above-mentioned methods, are shown in Table 6.

TABLE 6

| | | | | Example | Comparative Example | | |
|---|---|---|---|---|---|---|---|
| Composition (part by mass) | | | | 28 | 15 | 16 | 17 |
| Polyol (A) | A-1 | Polyol (A-ii-1) | Polyether polyol; bifunctional; hydroxyl value 55 mgKOH/g | 45.9 | 72.9 | | |
| | A-2 | Polyol (A-ii-2) | Polyether polyol; trifunctional; 530 hydroxyl value mgKOH/g | 7.7 | 7.7 | 8.3 | 44.3 |
| Polyisocyanate (B) | B-1 | | Polymeric MDI | 19.4 | 19.4 | 55.7 | 55.7 |
| Dispersion (M) in which polymer fine particles (C) are dispersed in polyol (A-1) (polyol (A-i)) <Content of polymer fine particles (C) in each dispersion (M) is 40% by mass> | M-1 | Core layer | MMA/ALMA = 87/4 | 45 | | | |
| | | Shell layer | MMA/BA/4HBA/ST = 2/8/1/2 | | | | |
| | | Tg of core layer | 10° C. (*) | | | | |
| | | Hydroxyl group content in shell layer | 0.53 (**) | | | | |
| | | Viscosity | 2 (***) | | | | |
| | | Volume average particle diameter | 0.35 μm | | | | |
| Dispersion (M) in which polymer fine particles (C) are dispersed in polyol (A-2) (polyol (A-i)) <Content of polymer fine particles (C) in each dispersion (M) is 33% by mass> | M-25 | Core layer | MMA/ALMA = 87/4 | | | 54 | |
| | | Shell layer | MMA/BA/4HBA/ST = 2/8/1/2 | | | | |
| | | Tg of core layer | 105° C. (*) | | | | |
| | | Hydroxyl group content in shell layer | 0.53 (**) | | | | |
| | | Viscosity | 40 or more (***) | | | | |
| | | Volume average particle diameter | 0.35 μm | | | | |
| Fumed silica | | | TS-720 | 0.5 | 0.5 | 0.5 | 0.5 |
| Dehydrating agent | | | Synthetic zeolite | 5 | 5 | 5 | 5 |
| Amount of polyisocyanate (B) relative to 100 parts of polyol (A4 (part by mass) | | | | 24 parts | 24 parts | 126 parts | 126 parts |
| Amount of polymer fine particles (C) relative to 100 parts of total amount of polyol (A) and polyisocyanate (B) (part by mass) | | | | 18 parts | — | 18 parts | — |
| Average hydroxyl value of polyol (A) (mgKOH/g) | | | | 101 | 101 | 530 | 530 |
| Physical properties of cured product | | | Maximum tensile stress (MPa) | 2.8 | 0.6 | 50.0 | 62.3 |
| | | | Elongation at maximum tensile stress (%) | 61 | 19 | 1.8 | 2.2 |
| | | | Durometer hardness <type A> of cured product | 70 | 58 | 99 | 99 |

(*) Glass transition temperature of core layer in polymer fine particles (C) as calculated in accordance with numerical formula (1)
(**) Content of hydroxyl groups in shell layer in polymer fine particles (C), (mmol/g)
(***) Viscosity of dispersion at 50° C. (Pa · s)

From results of Comparative Examples 16 and 17 shown in Table 6, when a polyol (A) having a large average hydroxyl value is used, a cured product has a low elongation, does not exert rubber elasticity, and has durometer A hardness of more than 95. In addition, when polymer fine particles are added, the cured product has decreased strength (maximum tensile stress).

In contrast, from results of Example 28 and Comparative Example 15, when a polyol (A) having a relatively small average hydroxyl value is used, a cured product has a Type A durometer hardness of 95 or less and the strength (maximum tensile stress) of the cured product can be improved significantly by the addition of polymer fine particles.

The invention claimed is:
1. A polyurethane curable composition comprising a polyol (A) and a polyisocyanate (B) as an essential component, wherein the composition comprises polymer particles (C) having a core-shell structure including at least a core layer and a shell layer,
the polymer particles (C) are contained in an amount of 1 to 150 parts by mass per 100 parts by mass of a total amount of the polyol (A) and the polyisocyanate (B), the core layer has a glass transition temperature (Tg) of more than 0° C. as calculated by the following numerical formula (1) and the core layer of the polymer particles (C) comprises a polymer polymerized with 80 to 99% by mass of a non-crosslinking monomer and 20 to 1% by mass of a crosslinking monomer, the polyol (A) has an average hydroxyl value of 1 to 150 mgKOH/g, a cured product formed by the curable composition has an elongation of more than 47% at a maximum tensile stress, $$1/Tg = \Sigma(M_i/Tg_i) \qquad (1)$$

wherein $M_i$ represents a weight fraction of the non-crosslinking monomer i constituting the core layer of the polymer particles, $Tg_i$ represents a glass transition temperature (K) of a homopolymer polymerize with the non-crosslinking monomer i, and i represents an integer of 1 or more.

2. The curable composition according to claim 1, wherein the cured product formed from the curable composition has durometer A hardness of 5 to 95 at 23° C. as defined by JIS K6253-3.

3. The curable composition according to claim 1, wherein the polyol (A) is a polyetherpolyol and/or an acrylpolyol.

4. The curable composition according to claim 3, wherein the polyetherpolyol is a polyoxypropylenepolyol.

5. The curable composition according to claim 1, wherein the core layer of the polymer particles (C) is a (meth)acrylate polymer.

6. The curable composition according to claim 1, wherein the shell layer of the polymer particles (C) is a (meth) acrylate polymer.

7. The curable composition according to claim 1, wherein the shell layer of the polymer particles (C) has a hydroxyl group.

8. The curable composition according to claim 7, wherein the polyol (A) comprises a polyol (A-i) for dispersing the polymer particles (C) and a polyol (A-ii) for addition which is different from the polyol (A-i) for dispersing the polymer particles (C), the polyol (A-i) has an average hydroxyl value of 1 to 300 mgKOH/g, and the curable composition comprises a dispersion including the polymer particles (C) having a hydroxyl group in the shell layer and the polyol (A-i) for dispersing the polymer particles (C), the polyol (A-ii) for addition, and the polyisocyanate (B).

9. The curable composition according to claim 1, wherein the shell layer of the polymer particles (C) has the hydroxyl group in an amount of 0.05 to 3.5 mmol/g.

10. The curable composition according to claim 1, wherein the polymer particles (C) have the shell layer graft-polymerized on the core layer, and the shell layer is polymerized with at least a monomer having a hydroxyl group.

11. The curable composition according to claim 1, wherein the polyol (A) comprises a polyesterpolyol in an amount of 50% by mass or less per 100% by mass of the polyol (A).

12. The curable composition according to claim 1, wherein the polymer particles (C) are dispersed in the curable composition in the state of primary particle.

13. The curable composition according to claim 1, wherein the polyol (A) comprises a multifunctional polyol having three or more functionality.

14. The curable composition according to claim 1, wherein the composition comprises a urethane prepolymer produced from the reaction of the polyol (A) and the polyisocyanate (B).

15. The curable composition according to claim 14, wherein the urethane prepolymer produced from the reaction of the polyol (A) and the polyisocyanate (B) has an isocyanate group, and an equivalent ratio (NCO/active hydrogen-containing group) of the isocyanate group (NCO) of the polyisocyanate (B) to the active hydrogen-containing group of the polyol (A) is 1.05 to 5.0.

16. An one pack type moisture-curable composition comprising the curable composition according to claim 15.

17. A two pack type curable composition comprising the curable composition according to claim 1, wherein the composition is composed of a first solution containing the polyisocyanate (B) and a second solution containing the polyol (A), and the polymer particles (C).

18. The curable composition according to claim 1, wherein an amount of water is 1 part by mass or less per 100 parts by mass of a total amount of the polyol (A) and the polyisocyanate (B).

19. The curable composition according to claim 1, wherein a urethane bond is contained in a main backbone of a polymer in the cured product formed from the curable composition.

20. A cured product comprising the curable composition according to claim 1.

21. An adhesive comprising the curable composition according to claim 1.

22. A polyurethane curable composition comprising a polyol (A) and a polyisocyanate (B) as an essential component, wherein the composition comprises polymer particles (C) having a core-shell structure including at least a core layer and a shell layer, the polymer particles (C) are contained in an amount of 1 to 150 parts by mass per 100 parts by mass of a total amount of the polyol (A) and the polyisocyanate (B), the core layer has a glass transition temperature (Tg) of more than 0° C. as calculated by the following numerical formula (1), the polyol (A) has an average hydroxyl value of 1 to 150 mgKOH/g, a cured product formed by the curable composition has an elongation of more than 47% at a maximum tensile stress, $$1/Tg = \Sigma(M_i/Tg_i) \qquad (1)$$

wherein $M_i$ represents a weight fraction of a non-crosslinking monomer i constituting the core layer of the polymer particles, $Tg_i$ represents a glass transition temperature (K) of a homopolymer polymerize with the non-crosslinking monomer i, and i represents an integer of 1 or more, wherein the shell layer of the polymer particles (C) has a hydroxyl group, and wherein the polyol (A) comprises a polyol (A-i) for dispersing the polymer particles (C) and a polyol (A-ii) for addition which is different from the polyol (A-i) for dispersing the polymer particles (C), the polyol (A-i) has an average hydroxyl value of 120 mgKOH/g or less, and the curable composition comprises a dispersion including the polymer particles (C) having a hydroxyl group in the shell layer and the polyol (A-i) for dispersing the polymer particles (C), the polyol (A-ii) for addition, and the polyisocyanate (B).

* * * * *